United States Patent [19]
Oda et al.

[11] Patent Number: 5,495,278
[45] Date of Patent: Feb. 27, 1996

[54] IMAGE FORMING APPARATUS INCLUDING A PULSE WIDTH MODULATOR

[75] Inventors: Yasuhiro Oda; Kazuhiko Arai; Kazuhiro Iwaoka, all of Kanagawa, Japan

[73] Assignee: Fuji Xerox Co., Ltd., Tokyo, Japan

[21] Appl. No.: 304,666

[22] Filed: Sep. 9, 1994

[30] Foreign Application Priority Data

Sep. 10, 1993 [JP] Japan .................................. 5-248474
Oct. 15, 1993 [JP] Japan .................................. 5-280713
Jan. 28, 1994 [JP] Japan .................................. 6-024977

[51] Int. Cl.⁶ .................................................. H04N 1/21
[52] U.S. Cl. .................................................... 347/252
[58] Field of Search .............................. 347/252, 254, 347/251; 358/298

[56] References Cited

U.S. PATENT DOCUMENTS 4,870,499  9/1989  Suzuki et al. ........................ 358/298
5,153,609  10/1992  Ando et al. ......................... 355/208

FOREIGN PATENT DOCUMENTS 1-169454  7/1989  Japan .
1-280965  11/1989  Japan .
4-13163  1/1992  Japan .
4-36776  2/1992  Japan .
4-37882  2/1992  Japan .
4-94261  3/1992  Japan .
4-97374  3/1992  Japan .

*Primary Examiner*—Mark J. Reinhart
*Attorney, Agent, or Firm*—Finnegan, Henderson, Farabow, Garrett & Dunner

[57] ABSTRACT

In an image forming apparatus including a pulse-width modulating unit for subjecting an image-density signal to pulse-width modulation and an image-forming unit for forming an image in accordance with a pulse-width modulation signal outputted by the pulse-width modulating unit, an arrangement is provided such that the image is formed with a small number of lines when the image density is a low density, while the image is formed with a large number of lines when the image density is a medium/high density. In an example of the arrangement thereof, the pulse-width modulating unit has a unit for effecting modulation on the basis of a plurality of different modulation periods, and is provided with a selecting unit for selecting a modulation period of a pulse-width modulated wave to be outputted, in accordance with the image-density signal.

6 Claims, 24 Drawing Sheets

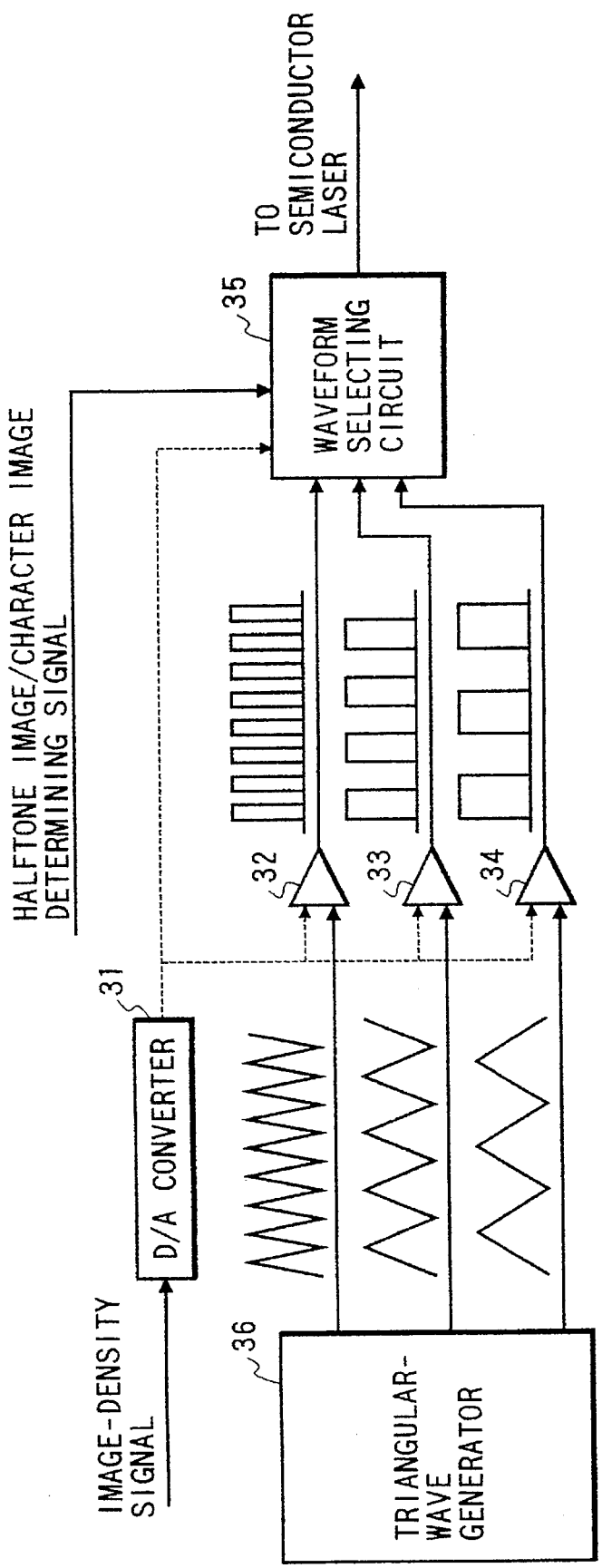

FIG. 4

| | PRESENT EMBODIMENT (VARIABLE NUMBER OF LINES) | IMAGE BASED ON 133-LINE SCREEN | IMAGE BASED ON 200-LINE SCREEN | MAIN-SCANNING BEAM DIAMETER ($1/e^2$) = 64μm<br>IMAGE BASED ON 400-LINE SCREEN |
|---|---|---|---|---|
| HALFTONE IMAGE<br>LOW-DENSITY PORTION<br>($C_{in} \leq 20\%$) | ○ | ○ | × | × |
| HALFTONE IMAGE<br>MEDIUM/HIGH-DENSITY PORTION<br>($C_{in} > 20\%$) | ○ | × | ○ | × |
| CHARACTER IMAGE | ○ | × | × | ○ |

FIG. 5(b) Sig(1) 
FIG. 5(c) Sig(2) 
FIG. 5(d) Sig(0) 
FIG. 5(e) Sig(0) Ref(1) 
FIG. 5(f) PWM(0) 

FIG. 7

MAIN-SCANNING BEAM DIAMETER ($1/e^2$) = 56μm

| | IMAGE BASED ON 150-LINE SCREEN | IMAGE BASED ON 300-LINE SCREEN | IMAGE BASED ON 600-LINE SCREEN |
|---|---|---|---|
| PRESENT EMBODIMENT | ○ | ○ | ◎ |
| HALFTONE IMAGE LOW-DENSITY PORTION ($Cin \leq 20\%$) | ○ | × REPRODUCIBILITY OF DOTS AND LINES IS POOR | × REPRODUCIBILITY OF DOTS AND LINES IS VERY POOR |
| HALFTONE IMAGE MEDIUM/HIGH-DENSITY PORTION ($Cin > 20\%$) | × REPRODUCTION OF CHARACTER MIXED IN HALFTONE IMAGE IS VERY POOR | ○ | × REPRODUCIBILITY OF DOTS AND LINES IS POOR |
| CHARACTER IMAGE | × VERY INFERIOR | ○ | ◎ |

◎ : VERY GOOD
○ : GOOD

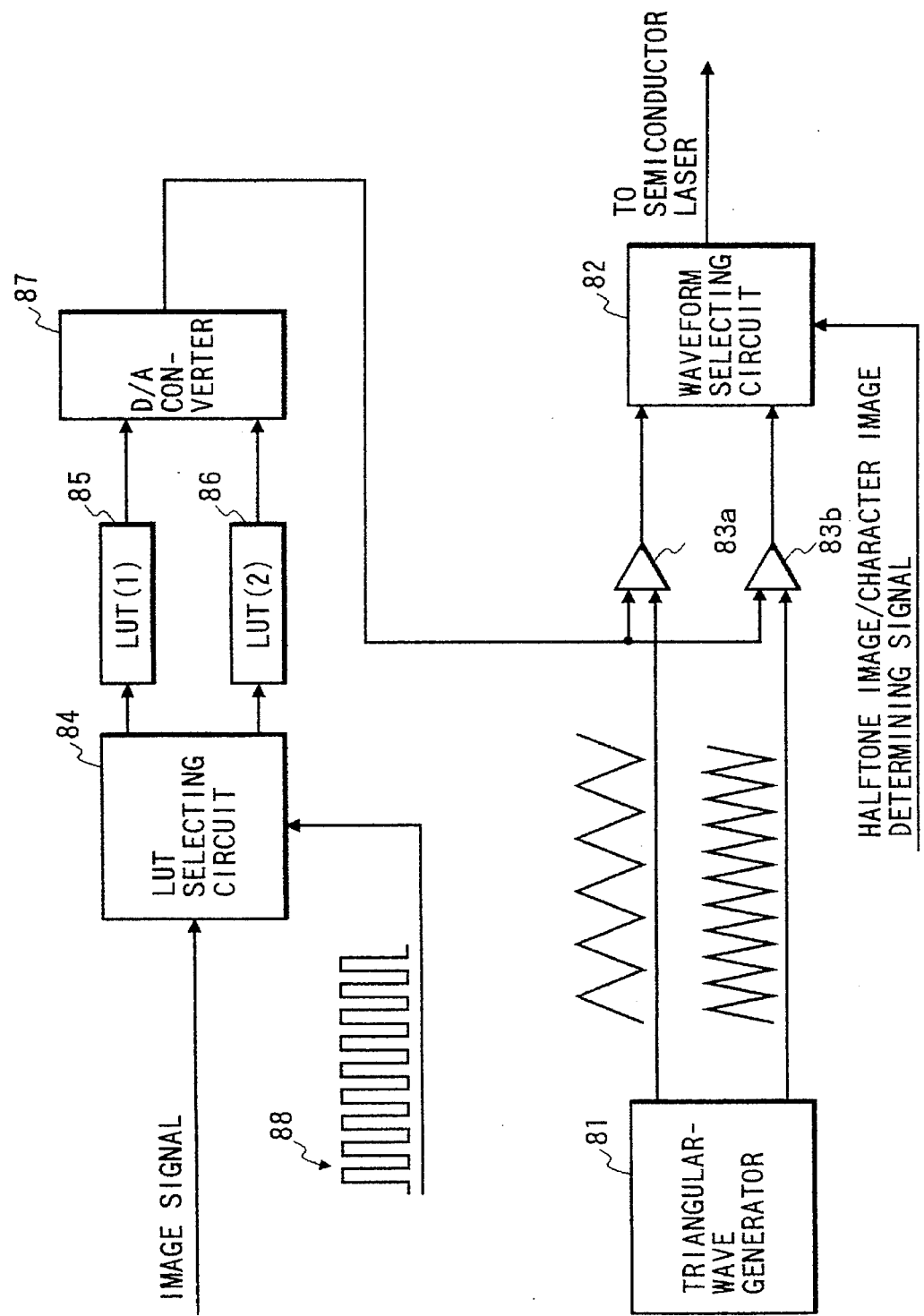

FIG. 10(b)  Sig(1) Ref(1) 
FIG. 10(c)  PWM(1) 
FIG. 10(d)  Sig(2) Ref(2) 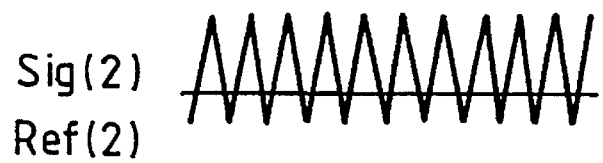
FIG. 10(e)  PWM(2) 
FIG. 10(f)  PWM(0) 

FIG. 17(a)

MAIN-SCANNING BEAM DIAMETER $(1/e^2) = 64\mu m$

|  | PRESENT EMBODIMENT (VARIABLE NUMBER OF LINES) | IMAGE BASED ON 133-LINE SCREEN | IMAGE BASED ON 200-LINE SCREEN | IMAGE BASED ON 400-LINE SCREEN |
|---|---|---|---|---|
| HALFTONE IMAGE<br>LOW-DENSITY PROTION ($Cin \leq 20\%$) | ○ | ○ | × | × |
| HALFTONE IMAGE<br>MEDIUM/HIGH-DENSITY PROTION ($Cin > 20\%$) | ○ | × | ○ | × |
| CHARACTER IMAGE | ○ | × | × | ○ |

FIG. 17(b)

| PHOTORECEPTOR | IMAGE IN A LOW-DENSITY PORTION (150 LINES) AFTER 5000 PRINTS |
|---|---|
| PHOTORECEPTOR ACCORDING TO THE INVENTION | REPRODUCIBILITY OF SCREEN LINES DOES NOT CHANGE SUBSTANTIALLY AS COMPARED WITH INITIAL PERIOD, AND GRAININESS IS ALSO GOOD. |
| SELENIUM PHOTORECEPTOR | REPRODUCIBILITY OF SCREEN LINES DECLINES, AND GRAININESS DETERIORATES AS COMPARED WITH INITIAL IMAGE. |

FIG. 21(a) Sig(0) 
FIG. 21(b) Sig(1) 
FIG. 21(c) Sig(2) 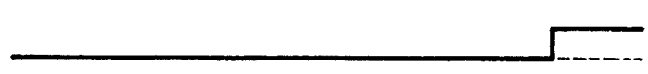
FIG. 21(d) Sig(3) 
FIG. 21(e) Sig(4) 
FIG. 21(f) Sig(5) 

IMAGE FORMING APPARATUS INCLUDING A PULSE WIDTH MODULATOR

BACKGROUND OF THE INVENTION

1. Field of the Invention

The present invention relates to an image forming apparatus of an electrophotographic system in which a latent image is formed on a photosensitive medium by scanning a laser beam, and the latent image is developed with a toner, so as to form an image.

2. Description of the Related Art

In printers and copying machines, a digital electrophotographic system is adopted widely as a method capable of providing high speed and high image quality. In this system, the optical scanning on a photosensitive medium is effected by using a light beam, and in order to reproduce gradations of the image, pulse-width modulation exposure is often carried out using an analog screen generator or the like (e.g., refer to Japanese Patent Unexamined Publication No. Hei. 1-280965).

In these printers and copying machines, image formation is effected by fixing both the spot diameter of the light beam and the number of lines in regions ranging from low-density portions to high-density portions. For this reason, the contrast of an exposure profile in a low-density portion declines and becomes analog-like. Further, since the amount of exposure itself is small, there have been problems in that the reproducibility of dots and lines deteriorates, and that the stability of gradation and color reproduction with respect to the environment deteriorates. These problems are particularly noticeable in cases where the following photosensitive materials, which are generally used as photosensitive materials, are used: a photosensitive material having an Se-based, an amorphous photosensitive layer exhibiting an attenuation of the potential approximately analogous to an amount of incident light, and a function-separated type photosensitive material comprised of a charge-generating layer and a charge-transporting layer and using an organic semiconductor.

With respect to the above-described problem, there has been proposed a system for stabilizing various elements, including the stabilization of the amount of the light beam and the stabilization of a toner concentration in a developing apparatus, and a system called process control in which the stability of gradation and color reproduction with respect to the environment is increased by measuring the temperature and humidity and the toner concentration in the developing apparatus and by controlling development bias and transfer current values (e.g., refer to Japanese Patent Unexamined Publication Nos. Hei. 4-37882 and Hei. 4-36776). However, these systems have a drawback in that a high-precision sensor and a control mechanism are required, with the result that the systems become complex and expensive.

With respect to the above-described problems of the photosensitive materials, the present inventors proposed an invention entitled "Image Forming Apparatus" so as to overcome the above-described problems. This is a high-image-quality color image forming apparatus which excels in gradation characteristics and can be realized with a compact size and light weight, wherein a photosensitive material in which attenuation of the potential occurs quickly on input thereto of a certain amount of light is used as a photosensitive material, and a substantially pulse-like electrostatic latent image is formed on the photosensitive material by effecting pulse modulation by setting the beam spot diameter in the main scanning direction to a size 0.5 times or less the pixel pitch in the main scanning direction as an exposure means. With this image forming apparatus, even if a nonmagnetic one-component developing system is used in which the dynamic range of the contrast potential in development is narrow, it is possible to faithfully develop an electrostatic latent image, and image formation based on a stable area-modulation method becomes possible. However, there have been cases where a reproduction starting point (an image signal value whereby development is started) particularly at a low-density portion becomes unstable due to the effect of changes in such as the spot diameter of the light beam and the light emission intensity of the light beam caused by changes in the environment.

In addition, systems have been proposed in which the spot diameter of the light beam and the light emission intensity of the light beam are made variable, a decline in the contrast of an exposure profile is suppressed, and the reproducibility of dots and lines is increased (e.g., Japanese Patent Unexamined Publication Nos. Hei. 4-13163, Hei. 4-97374, and Hei. 4-94261). However, these systems have a drawback in that they require a control mechanism for making variable the spot diameter of the light beam and the light emission intensity, with the result that the systems become complex and expensive.

SUMMARY OF THE INVENTION

The present invention aims to eliminate the above-described problems and drawbacks of the conventional art, to improve the reproducibility of dots and lines in a low-density portion, and to improve the stability of gradation and color reproduction with respect to the environment. In addition, the present invention aims at attaining the above object at low cost.

To attain the above objects, the present invention provides an image forming apparatus including pulse-width modulating means for subjecting an image-density signal to pulse-width modulation and image-forming means for forming an image in accordance with a pulse-width modulation signal outputted by the pulse-width modulating means, wherein the pulse-width modulating means has means for effecting modulation on the basis of a plurality of different modulation periods, and is provided with selecting means for selecting a modulation period of a pulse-width modulated wave to be outputted, in accordance with the image-density signal.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings, FIG. 1 is a diagram illustrating a configuration of a pulse-width modulator according to a first embodiment of the present invention;

FIG. 4 is a diagram illustrating the results of evaluation of image quality and stability of gradation and color reproduction with respect to the environment;

FIGS. 5(b) to 5(f) are waveform diagrams illustrating the waveforms of the signals of the respective portions;

FIG. 7 is a diagram illustrating the results of evaluation of image quality and stability of gradation and color reproduction with respect to the environment;

FIG. 8 is a diagram illustrating a configuration of a pulse-width modulator according to a third embodiment of the present invention;

FIGS. 10(b) to 10(f) are waveform diagrams illustrating the waveforms of the signals of the respective portions;

FIGS. 17(a) and 17(b) are diagrams illustrating the results of evaluation of image quality and stability of gradation and color reproduction with respect to the environment;

FIGS. 21(a) to 21(f) are diagrams illustrating the process of waveform/generation by the pulse-width modulator;

DETAILED DESCRIPTION OF THE PREFERRED EMBODIMENTS (1st Embodiment)

Figure 3:
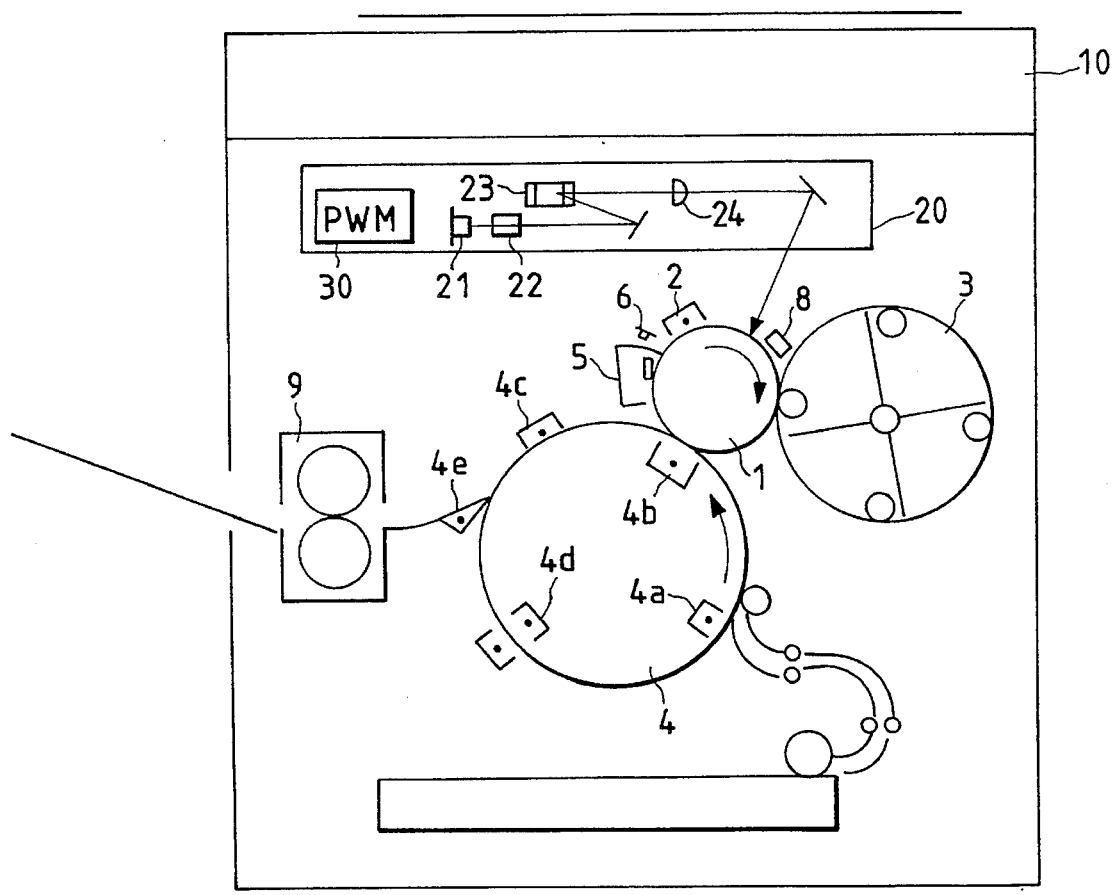
FIG. 3 is a diagram illustrating an arrangement of the embodiment of an image forming apparatus according to the present invention.

FIG. 3 is a diagram illustrating a schematic arrangement of an embodiment of an image forming apparatus in accordance with the present invention.

A charger 2, a rotating developing device 3, a transfer drum 4, a cleaner 5, a pre-exposing device 6, and a potential sensor 8 are disposed around a photoreceptor 1 which rotates in the direction of the arrow.

The photoreceptor 1 is charged uniformly by the charger 2 in a dark section. Incidentally, if a known contact charger (a charging brush, a charging roller, a charging blade, or a charging belt) is used for the charger 2, it is possible to prevent the generation of ozone.

A light beam scanner 20 is comprised of a semiconductor laser 21, a collimator lens 22, a polygon mirror 23, an image-forming optical system 24, and the like, and causes the light beam to scan on the photoreceptor 1. In addition, the light beam is turned on and off by a light beam pulse-width modulator 30 in response to a density signal supplied from an original reading section 10 or the like. The exposure of the photoreceptor 1 is effected by the light beam pulse thus turned on and off, and an electrostatic latent image is formed. The spot diameter ($1/e^2$) of the light beam in the main scanning direction on the photoreceptor 1 was set to 64 μm.

The rotating developing device 3 is comprised of four developing units having yellow, cyan, magenta, and black toners, respectively. Each of the developing units adopts a reversal development system using two-component magnetic brush development. As the average toner particle size, 7 μm was used. The rotating developing device 3 is rotated, as required, to develop an electrostatic latent image by the toner of a desired color. At this time, a bias voltage is applied to a developing roller to suppress the adhesion of the toner to a white background portion.

A charger 4a for absorbing recording material, a transfer charger 4b, a charger 4c for releasing, a charger 4d for discharging, and a release finger 4e are provided along with the transfer drum 4.

The transfer drum 4 has paper placed around its outer periphery, and rotates. The developed toner image on the photoreceptor is transferred to the paper by a transfer charger 4b.

The formation, development, and transfer of the electrostatic latent image is effected for each color of yellow, cyan, magenta, and black. The toner on the paper obtained through this operation is fused by a fusing device 9, thereby forming a multi-color image.

As shown in FIG. 1, the pulse-width modulator 30 for turning on and off the light beam is comprised of a D/A converter 31, a triangular-wave generator 36, comparator circuits 32, 33, and 34, and a selector circuit 35.

The D/A converter 31 converts a digital image-density signal supplied by the original reading section 10 or the like to an analog image-density signal.

The triangular-wave generator 36 generates pattern signals of three kinds of triangular waves. The ratio among the periods of the respective pattern signals is set to 1 : 2 : 3, and are made to correspond to 400-line screen, 200-line screen, and 133-line screen, respectively. Since the spot diameter ($1/e^2$) of the light beam in the main scanning direction on the photoreceptor 1 is set to 64 μm, the values of D become 1, 1/2, and 1/3, respectively.

The comparator circuits 32, 33, and 34 compare the relative magnitude between each pattern signal and the analog image-density signal, and prepares a pulse-width modulation signal.

From among a plurality of pulse-width modulation signals prepared by the comparator circuits, the selector circuit 35 selects one pulse-width modulation signal in response to the value of the image-density signal and a halftone image/character image determining signal.

If it is determined from the halftone image/character image determining signal that the image is a character image, a pulse-width modulation signal corresponding to 400-line screen is selected irrespective of the value of the image-density signal. Meanwhile, if it is determined that the image is a halftone image, and if it is determined from the image-density signal that the signal is that of a low-density portion whose pulse width is 20% or less, a pulse-width modulation signal corresponding to 133-line screen is selected. In other cases, a pulse-width modulation signal corresponding to 200-line screen is selected.

FIG. 4 shows the results of overall evaluation of the image quality and the stability of gradation and color reproduction with respect to the environment in the case of images in which the number of lines is made variable in accordance with this embodiment and in the case of images prepared with the number of lines fixed in a conventional manner. It can be appreciated that, in accordance with this embodiment, the stability of gradation and color reproduction with respect to the environment improves in a low-density portion, and smooth images can be formed in medium/high-density portions without the dots and lines being visually perceived in a conventional manner.

As detailed above, in accordance with this embodiment, when a halftone image is formed, the number of lines is made variable in response to an image-density signal by using the pulse-width modulator 30, and the number of lines at the time of forming a low-density portion is made fewer than the number of lines at the time of forming medium/high-density portions, so as to effect image formation. Further, if it is assumed that the distance between adjacent ones of pixels in the main scanning direction at the time of forming a low-density portion is dP (mm), and that the spot diameter ($1/e^2$) of the light beam in the main scanning direction on the photosensitive medium is dB (mm), the following formula is satisfied:

$$dB \leq (1/3)dP.$$

Consequently, the reproducibility of dots and lines in the low-density portion improves, and the stability of gradation and color reproduction with respect to the environment improves.

As a method of varying the number of lines, the pulse-width modulator 30 is provided with the function of effecting pulse-width modulation in accordance with an analog image-density signal and a pattern signal of a predetermined period due to the triangular-wave generator 36. In addition, pattern signals of different periods of two or more kinds are provided as the pattern signals, and the pulse-width modulator 30 is provided with the function of selecting one from among pulse-width modulation signals of two or more kinds obtained by the pattern signals of two or more kinds, in response to an image-density signal. Accordingly, the above-described advantage can be demonstrated without requiring process control and a light-emitting intensity varying device which are complex and expensive.

In the invention, the light-beam scanning means in the image-forming means scans a light beam with respect to a photosensitive medium. The image-forming optical system forms a light beam spot of a predetermined size. Then, the pulse-width modulating means determines an on/off duration of the light beam in response to an image-density signal. As a result, a latent image corresponding to the image-density signal is formed on the photosensitive medium. This latent image is subsequently made visible by powder toner or liquid toner, thereby forming an image.

Figure 2A:
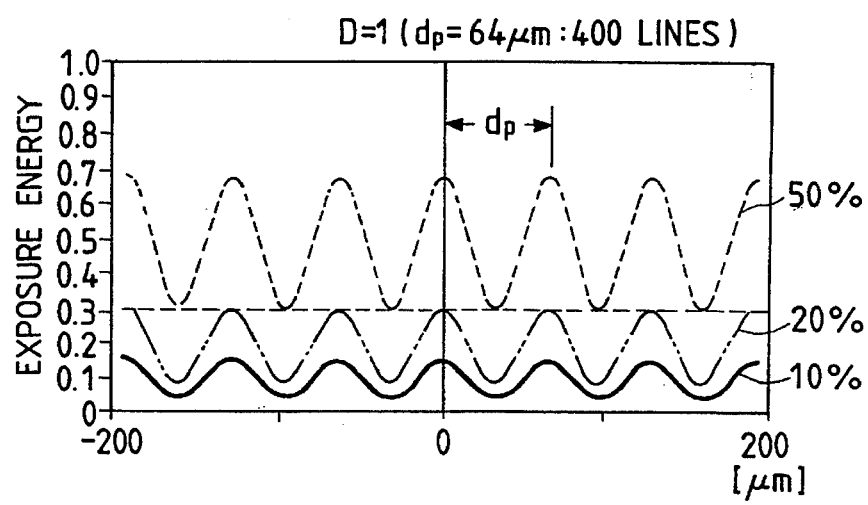
FIGS. 2(a) to 2(c) are explanatory diagrams of the operation in the present invention.
Figure 2B:
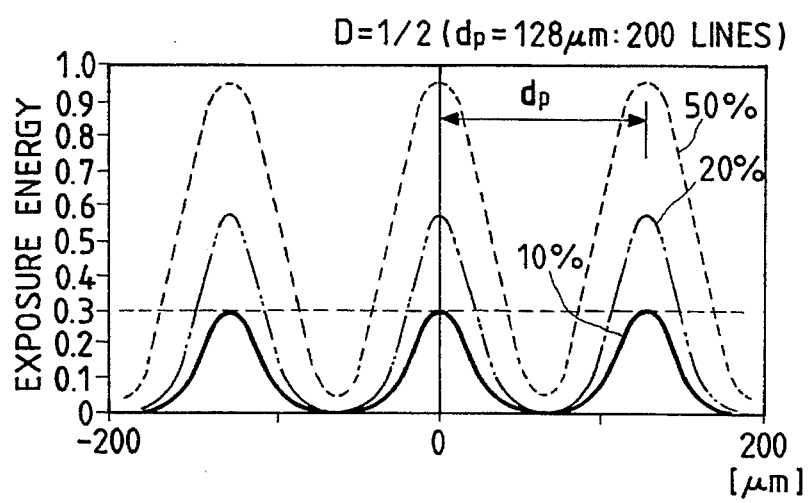
Figure 2C:
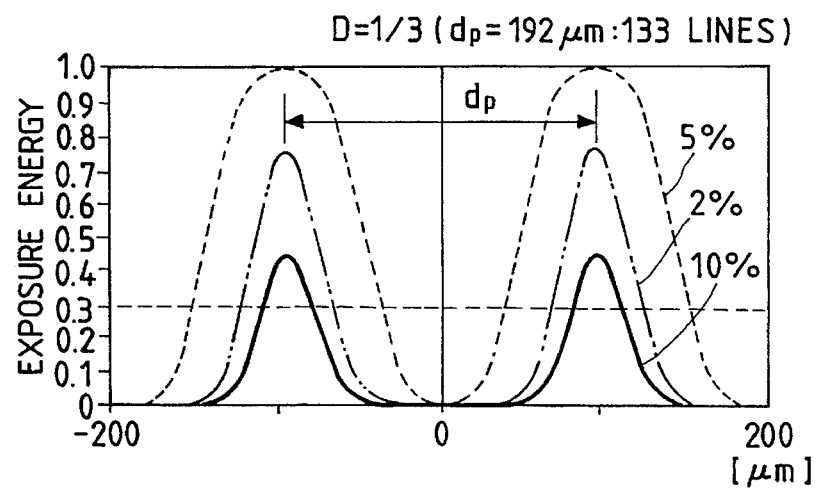

FIGS. 2($a$), 2($b$), and 2($c$) show examples of an exposure energy profile on the photosensitive medium when the photosensitive medium is exposed by using the light-beam scanning means, the image-forming optical system, the pulse-width modulating means in the image-forming means. These drawings show the results when the values of D are 1/1, 1/2, and 1/3, respectively, if the ratio between the distance dP (mm) between adjacent ones of the pixels and the spot diameter dB of the light beam is set to be D. Incidentally, in these examples, the spot diameter of the light beam is fixed at 64 μm.

In addition, in electrophotography, a bias voltage is applied during development so as to prevent the adhesion of a toner to the background. FIGS. 2($a$) to 2($c$) each shows a case where reversal development is used for developing an exposed portion, and a boundary line corresponding to the bias voltage is also shown by the broken line.

As is noticeable in FIG. 2($a$), as the pulse width (%) is reduced, the contrast of the exposure energy profile declines, and becomes analog-like. An amount exceeding the boundary line corresponding to the bias voltage decreases, so that it becomes impossible to reproduce dots or lines.

As is apparent from FIGS. 2($a$) to 2($c$), the smaller the value of D is made in the order of 1/1, 1/2, and 1/3, the more the decline in the contrast is suppressed. As a result, it can be appreciated that when the spot diameter dB of the light beam is fixed, if the distance dP is made larger, and the value of D is made smaller, dots and lines in a low-density portion are reproduced satisfactorily, and the stability of gradation and color reproduction with respect to the environment increases.

Meanwhile, in medium/high-density portions, the structure of dots and lines is difficult to perceive, so that it is preferred that the number of lines be higher, as is conventionally known.

Consequently, it can be understood that, in electrophotography, if the spot diameter dB of the light beam is fixed, an optimum number of lines is present in reproducing each density, and by selecting an optimum number of lines in each case in reproducing each density, it is possible to obtain a satisfactory image excelling in stability with respect to the environment.

(2nd Embodiment)

In this embodiment, the pulse-width modulator for turning on and off the light beam in the first embodiment is arranged by a different configuration. In this second embodiment, since the arrangements other than that of the pulse-width modulator are similar to those of the first embodiment, a description thereof will be omitted.

Figure 5A:
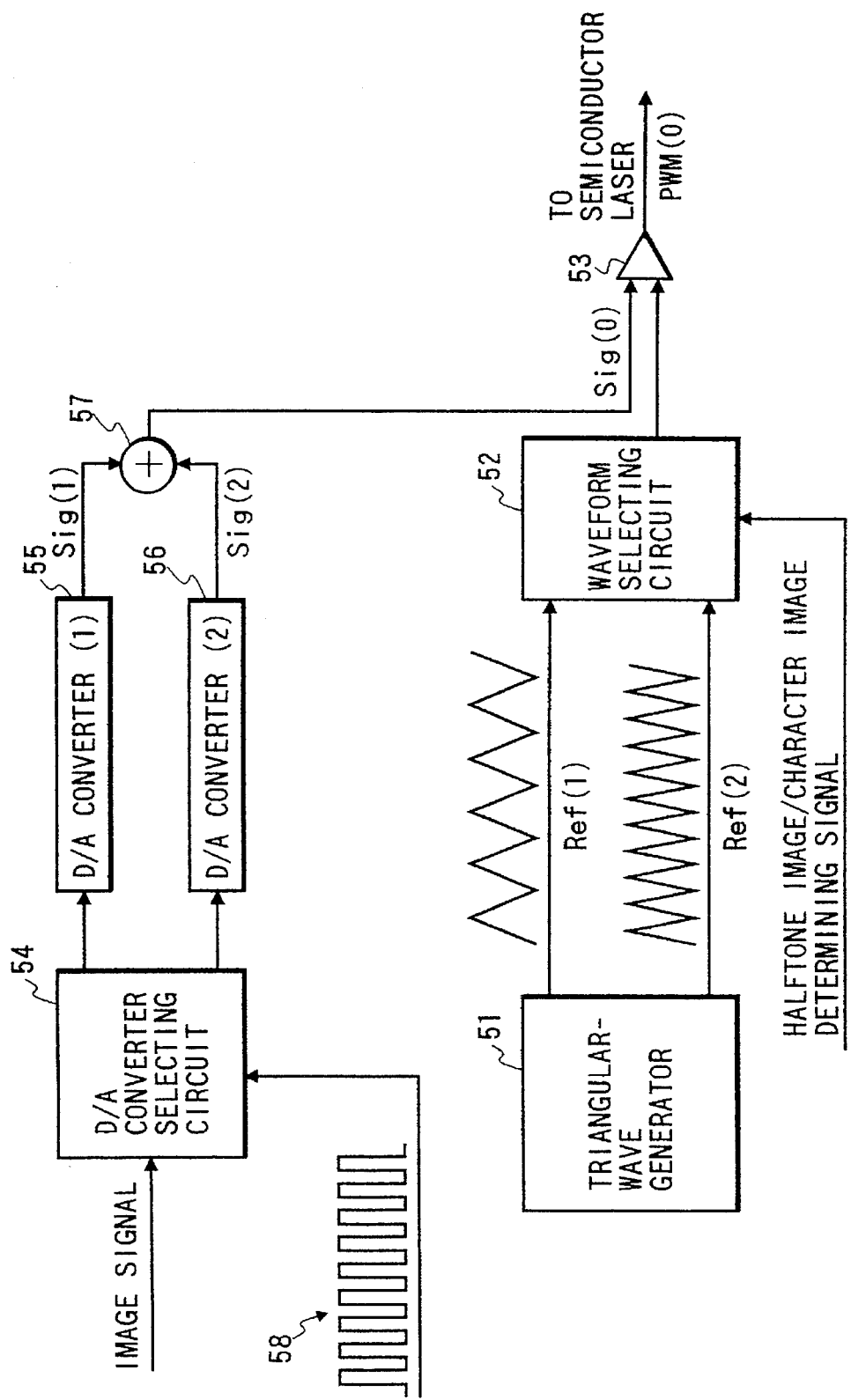
FIG. 5(a) is a diagram illustrating a configuration of a pulse-width modulator according to a second embodiment of the present invention.

As shown in FIG. 5($a$), the pulse-width modulator is comprised of a triangular-wave generator 51, a waveform selecting circuit 52, a comparator circuit 53, a D/A converter selecting circuit 54, a first D/A converter 55, a second D/A converter 56, and an adder circuit 57.

The D/A converter selecting circuit 54 is constituted by a counter, a flip-flop circuit, and the like, counts a reference clock signal 58, and selectively outputs digital image-density signals supplied from the original reading section 10 (FIG. 3) or the like, to the first and second D/A converters 55 and 56 whose characteristics differ in terms of their periods.

After the selectively outputted digital image-density signals are converted to analog image-density signals by the first and second D/A converters 55 and 56 having different characteristics, the converted image-density signals are synthesized again by the adder circuit 57, and are inputted to the comparator circuit 53. The waveform Sig(1) in FIG. 5(*b*) shows an output of the first D/A converter 55, the waveform Sig(2) in FIG. 5(*c*) shows an output of the second D/A converter 56, and the waveform Sig(0) in FIG. 5(*d*) shows an output of the adder circuit 57.

The triangular-wave generator 51 generates pattern signals of two kinds of triangular waves (reference triangular waves Ref(1) and Ref(2)). The periods of the respective pattern signals are made to correspond to 600-line screen and 300-line screen, respectively. Since the spot diameter ($1/e^2$) of the light beam in the main scanning direction on the photoreceptor 1 (FIG. 3) is set to 56 µm, the values of D become 4/3 and 2/3, respectively.

On the basis of the halftone image/character image determining signal, the waveform selecting circuit 52 selects one triangular wave from the two reference triangular waves Ref(1) and Ref(2) outputted by the triangular-wave generator 51, and outputs the same to the comparator circuit 53.

The comparator circuit 53 compares the relative magnitude between the selected reference triangular wave Ref(1) or Ref(2) and the analog image-density signal Sig(0), and prepares a pulse-width modulation signal PWM(0) as shown in FIGS. 5(*e*) and 5(*f*).

Figure 6A:
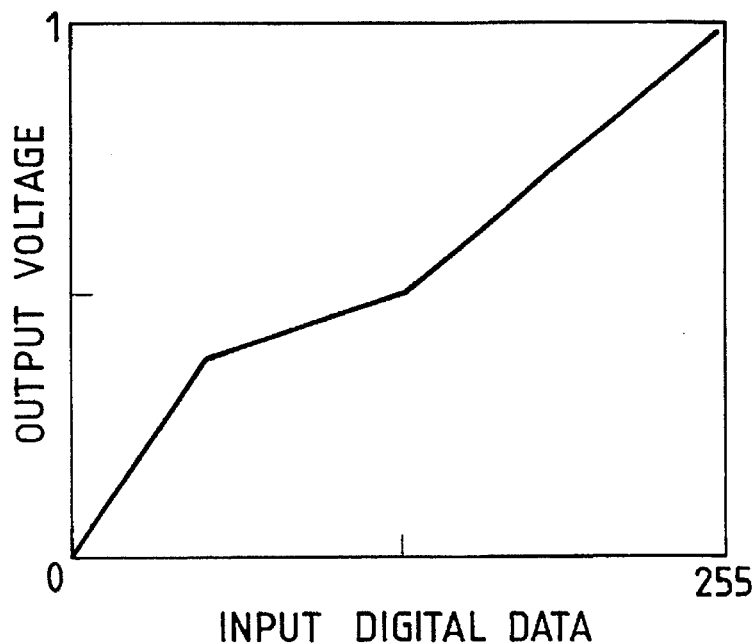
FIG. 6(a) is a D/A conversion characteristic diagram of a first D/A converter.
Figure 6B:
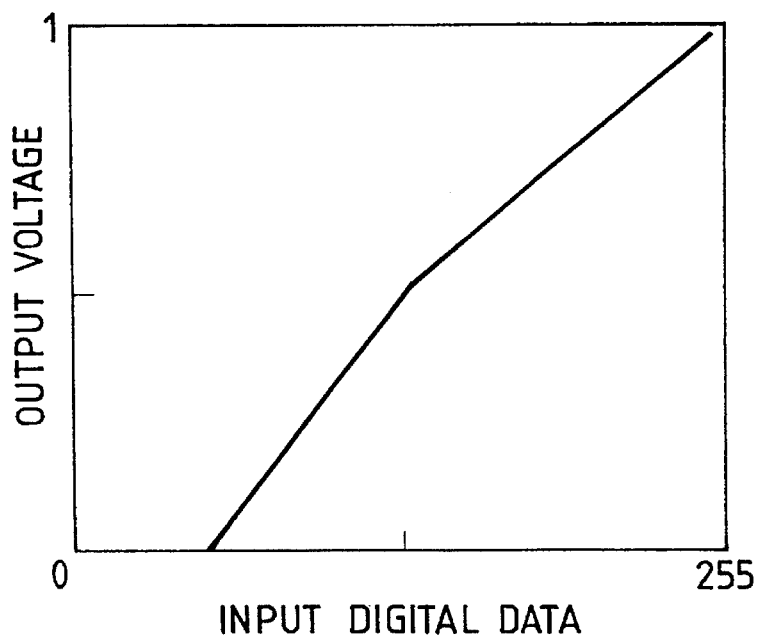
FIG. 6(b) is a D/A conversion characteristic diagram of a second D/A converter.

FIGS. 6(*a*) and 6(*b*) show D/A conversion characteristics of the first and second D/A converters 55 and 56 for converting 8-bit input digital data to voltages. Here, the output voltage is normalized to 1. As shown in FIG. 6(*a*), in a region where the input digital image density is less than 20%, the first D/A converter 55 exhibits such a characteristic that an analog output corresponding to a value in which the image density is increased is obtained. In a region where the image-density signal is 20% or more and less than 50%, the first D/A converter 55 has such a characteristic that an analog output corresponding to a value in which the image density is slightly increased is obtained. In a region of 50% or more, the first D/A converter 55 has such a characteristic that there is no increase in the amplitude, and an analog output value corresponding to a digital value is obtained. As shown in FIG. 6(*b*), in the region where the value of the input digital data is less than 20%, the second D/A converter 56 has such a characteristic that the output value becomes zero. In the region where the image-density signal is 20% or more and less than 50%, the second D/A converter 56 has such a characteristic that an analog output corresponding to a value in which the image density is increased substantially is obtained. In the region of 50% or more, the second D/A converter 56 has such a characteristic that there is no increase in the amplitude, and an analog output value corresponding to a digital value is obtained.

When the halftone image/character image determining signal indicates that the image is a halftone image, the waveform selecting circuit 52 selects a triangular wave of the period corresponding to the 300-line screen, and outputs the same to the comparator circuit 53. When this halftone image is generated, in the case of the halftone region where the digital image-density signal is 50% or more, the halftone is generated by a 300-line screen in the same way as in the pulse-width modulation system which is generally adopted.

In the halftone region where the digital image-density signal is less than 50% and 20% or more, that portion of the image is periodically composed by portions subjected to D/A conversion by the first D/A converter 55 and portions subjected to D/A conversion by the second D/A converter 56. In a region where the digital image-density signal is close to 20%, portions subjected to D/A conversion by the second D/A converter substantially do not contribute to the image formation. Further, in the halftone region where the digital image-density signal is less than 20%, only the portions subjected to D/A conversion by the first D/A converter 55 contribute to the image formation. Consequently, the number of lines in the low-density portion is halved, so that the halftone image is formed by a 150-line screen having half the number of the lines of the 300-line screen. Hence, it is possible to improve the reproducibility of dots and lines in the low-density portion, and to improve the stability of gradation and color reproduction with respect to the environment.

When the halftone image/character image determining signal indicates that the image is a character image, the waveform selecting circuit 52 selects a triangular wave of the period corresponding to the 600-line screen, and outputs the same to the comparator circuit 53. Since the character image is generally formed by a high-density portion, the character image is in the region where the conversion characteristics of the first and second D/A converters are 50% or more, so that the character image is formed by a 600-line screen, and the character image is reproduced very satisfactorily.

FIG. 7 shows the results of overall evaluation of the image quality and the stability of gradation and color reproduction with respect to the environment in the case of images formed by using the pulse-width modulator described in the first embodiment of the present invention by using a remodeled version of a digital color copying machine A-Color (trademark) made by FUJI XEROX CO., LTD. and in the case of images prepared with the number of lines fixed in a conventional manner. It can be appreciated that, in accordance with this embodiment, the stability of gradation and color reproduction with respect to the environment improves in a low-density portion, and smooth images and characters can be formed in medium/high-density portions without the dots and lines being visually perceived in a conventional manner.

(3rd Embodiment)

In this embodiment, the pulse-width modulator for turning on and off the light beam in the first or second embodiment is arranged by a different configuration. Since the arrangements other than that of the pulse-width modulator are similar to those of the first embodiment, a description thereof will be omitted.

Figure 9A:
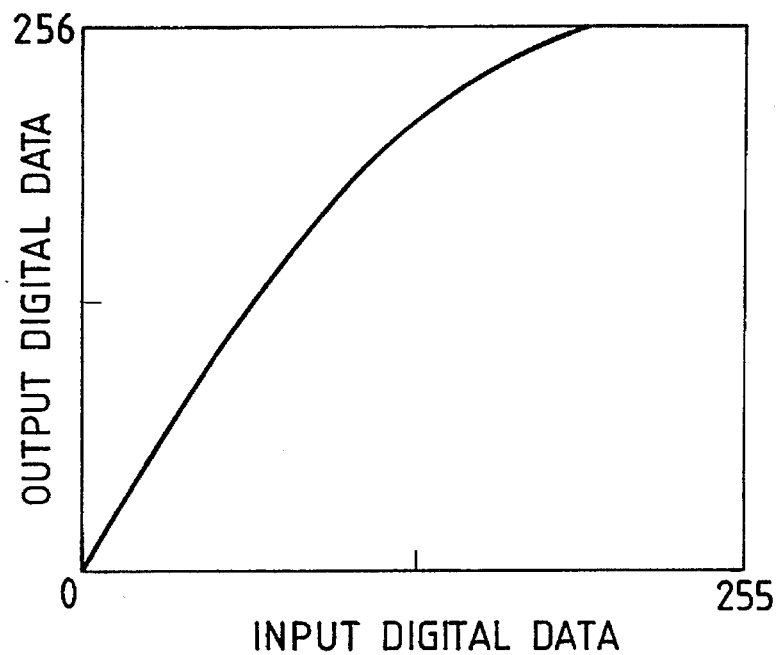
FIG. 9(a) is a data conversion characteristic diagram of a first LUT.
Figure 9B:
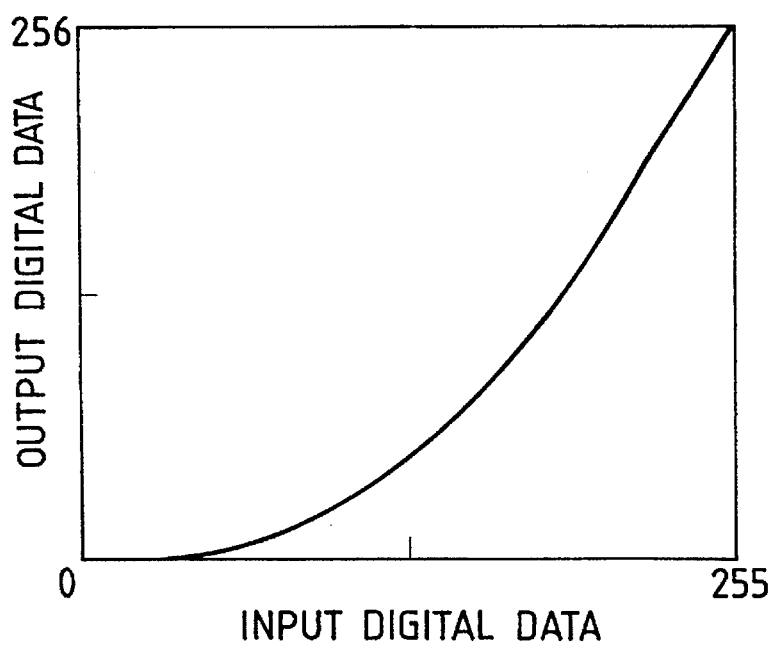
FIG. 9(b) is a data conversion characteristic diagram of a second LUT.

As shown in FIG. 8, the pulse-width modulator in this embodiment is comprised of a triangular-wave generator 81, a waveform selecting circuit 82, a comparator circuit 83*a*, a comparator circuit 83*b*, a look-up table selecting circuit 84, a first look-up table (LUT(1)) 85, a second look-up table (LUT(2)) 86, and a D/A converter 87. Namely, in this embodiment, the pulse-width modulator is arranged by substituting the first and second D/A converters of the second embodiment by the first look-up table (LUT(1)) 85, the second look-up table (LUT(2)) 86, and the common D/A converter 87. The data conversion characteristics of the first and second look-up tables are shown in FIGS. 9(*a*) and 9(*b*). Namely, the conversion characteristics of the first look-up table are such that, as shown in FIG. 9(*a*), a 2-fold output is obtained with respect to an input at less than 25%, then the conversion rate is decreased gradually, and a maximum value is always outputted at 75% or more. The conversion characteristics of the second look-up table are such that, as shown in FIG. 9(b), zero is always outputted at less than 25%, the conversion rate is increased gradually at 25% or more, and an approximately 2-fold output of an input signal is obtained at 75% or more.

When the halftone image/character image determining signal indicates that the image is a halftone image, the waveform selecting circuit 82 selects a pulse-width modulation signal generated by using a triangular wave of the period corresponding to the 300-line screen. When this halftone image is generated, in the case of the halftone region where the digital image-density signal is 25% or more, this system, on an average, is virtually not different from the pulse-width modulation system which is generally adopted, and the halftone is generated by a 300-line screen. In the halftone region where the digital image-density signal is less than 25%, that portion of the image is alternately subjected to D/A conversion in the form of portions converted by the first look-up table 85 and portions converted by the second look-up table 86. However, an output of the portion converted by the second look-up table is 0. Namely, in the region where the digital image-density signal is less than 50%, only the portions converted by the first look-up table 85 contribute to the image formation, and the portions converted by the second look-up table 86 do not contribute to the image formation Consequently, the number of lines in the region at less than 25% is halved, so that the halftone image is formed by the 150-line screen having half the number of the lines of the 300-line screen. Hence, it is possible to improve the reproducibility of dots and lines in the low-density portion, and to improve the stability of gradation and color reproduction with respect to the environment.

When the halftone image/character image determining signal indicates that the image is a character image, the waveform selecting circuit 82 selects a pulse-width modulation signal generated by using a triangular wave of the period corresponding to the 600-line screen. Since the character image is generally formed by a high-density portion, the character image is in the region where the conversion characteristics of the first and second look-up tables are 25% or more, so that the character image is formed by the 600-line screen, and the character image is reproduced very satisfactorily.

(4th Embodiment)

In this embodiment, the pulse-width modulator for turning on and off the light beam in the first to third embodiments is arranged by still another configuration. Since the arrangements other than that of the pulse-width modulator are similar to those of the first embodiment, a description thereof will be omitted.

Figure 10A:
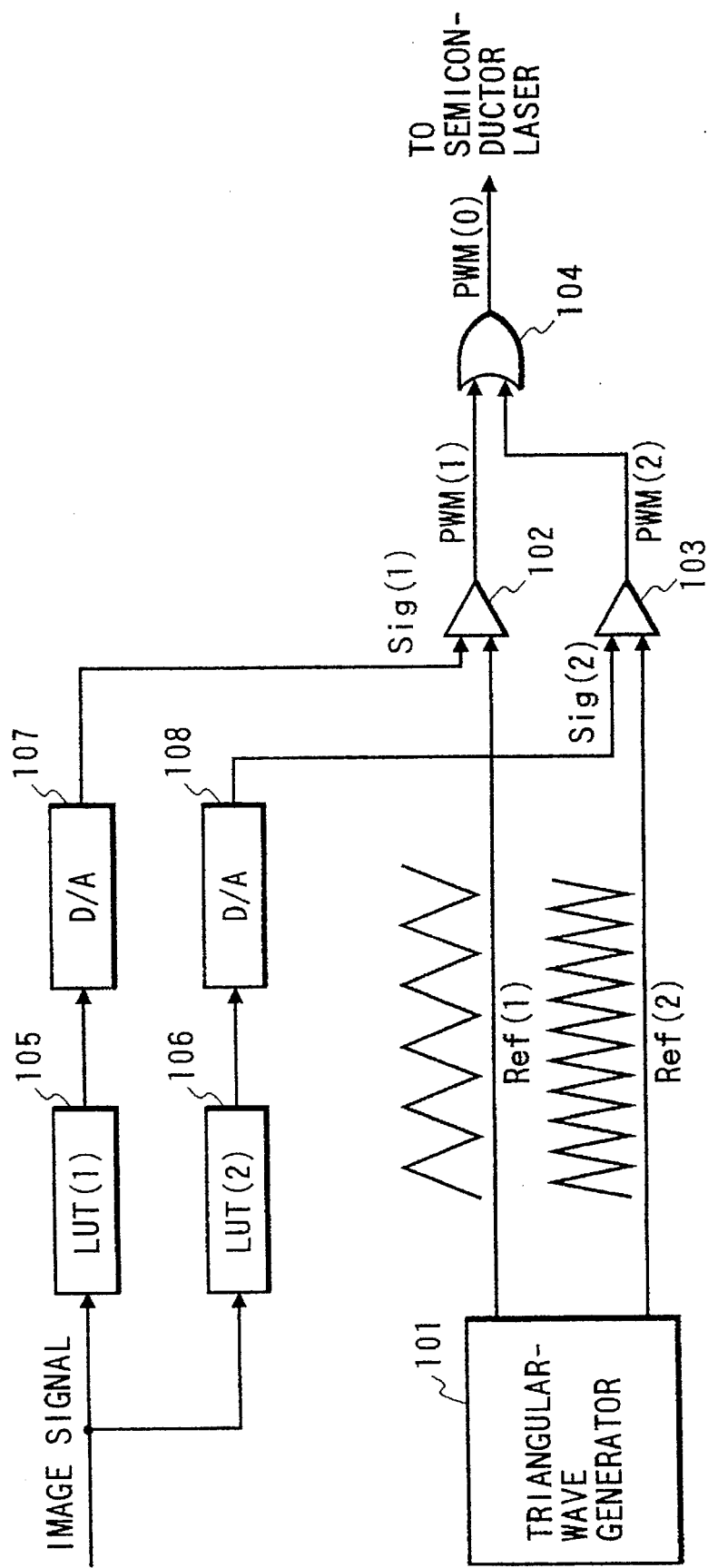
FIG. 10(a) is a diagram illustrating a configuration of a pulse-width modulator according to a fourth embodiment of the present invention.
Figure 11A:
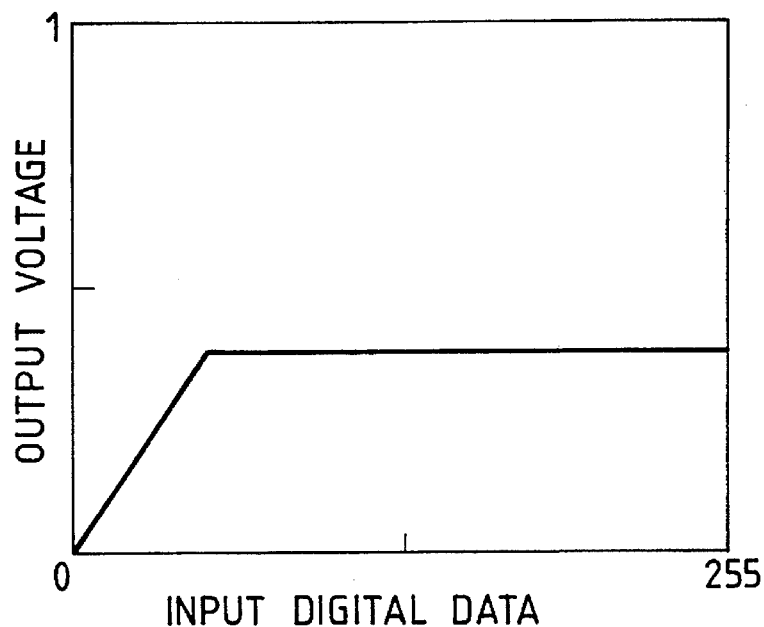
FIG. 11(a) is a conversion characteristic diagram of a first LUT and a first D/A converter.
Figure 11B:
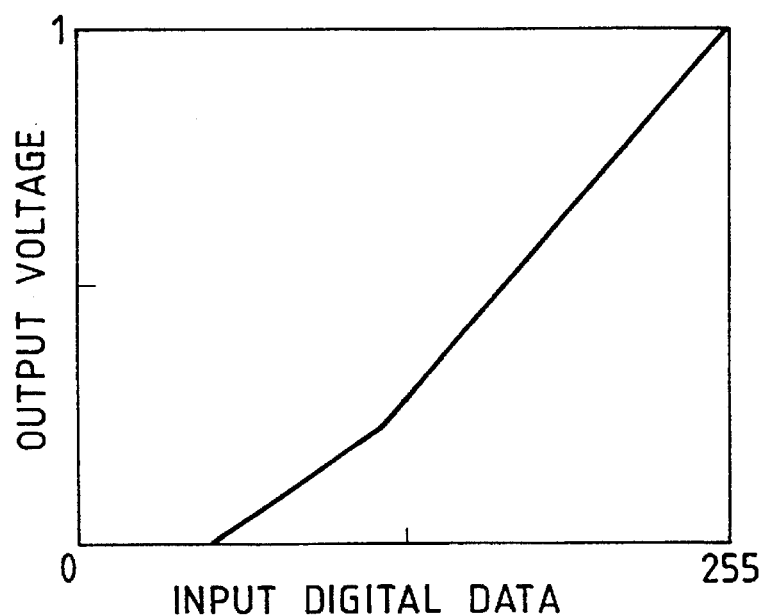
FIG. 11(b) is a conversion characteristic diagram of a second LUT and a second D/A converter.

As shown in FIG. 10(a), the pulse-width modulator in this embodiment is comprised of a triangular-wave generator 101, first and second comparator circuits 102 and 103 an OR circuit 104, first and second look-up tables (LUT(1)) 105, (LUT(2)) 106, first and second D/A converters 107, 108, and a D/A converter selecting circuit (not shown). FIG. 11(a) shows conversion characteristics of the first look-up table 105 and the first D/A converter 107. FIG. 11(b) shows conversion characteristics of the second look-up table 106 and the second D/A converter 108.

The unillustrated D/A converter selecting circuit periodically outputs digital image-density signals supplied from the original reading section 10 (FIG. 3), selectively to the first and second look-up tables 105 and 106. After the selectively outputted digital image-density signals have their characteristics converted by the first and second lookup tables 105 and 106, the digital image-density signals are subjected to D/A conversion by the first and second D/A converters 107 and 108 and are inputted to the first and second comparator circuits 102 and 103 as analog image-density signals.

The first and second comparator circuits 102 and 103 compare the relative magnitude between their respective reference triangular waves having difference frequencies and the analog image signal, and prepares a pulse-width modulation signal. FIGS. 10(b) and 10(c) show the input/output relation of the comparator circuit 102. When the conversion output Sig(1) by the first look-up table 105 and the D/A converter 107 and the reference triangular wave Ref(1) are inputted to the comparator circuit 102, the comparator circuit 102 outputs a pulse-width modulation signal PWM(1) shown in FIG. 10(c). FIGS. 10(d) and (e) show the input/output relation of the comparator circuit 103. When the conversion output Sig(2) by the second look-up table 106 and the D/A converter 108 and the reference triangular wave Ref(2) are inputted to the comparator circuit 103, the comparator circuit 103 outputs a pulse-width modulation signal PWM(2) shown in FIG. 10(e). The OR circuit 104 synthesizes two pulse-width modulation signals PWM(1) and PWM(2), and outputs a desired pulse-width modulation signal PWM(0) shown in FIG. 10(f).

In the region where the digital image-density signal is less than 20%, only the portions converted by the first look-up table 105 and the D/A converter 107 contribute to the image formation, and portions converted by the second look-up table 106 do not contribute to the image formation. Consequently, the number of lines in the region at less than 20% is halved, so that it is possible to improve the reproducibility of dots and lines in the low-density portion. Also, it is possible to improve the stability of gradation and color reproduction with respect to the environment.

(5th Embodiment)

Figure 12:
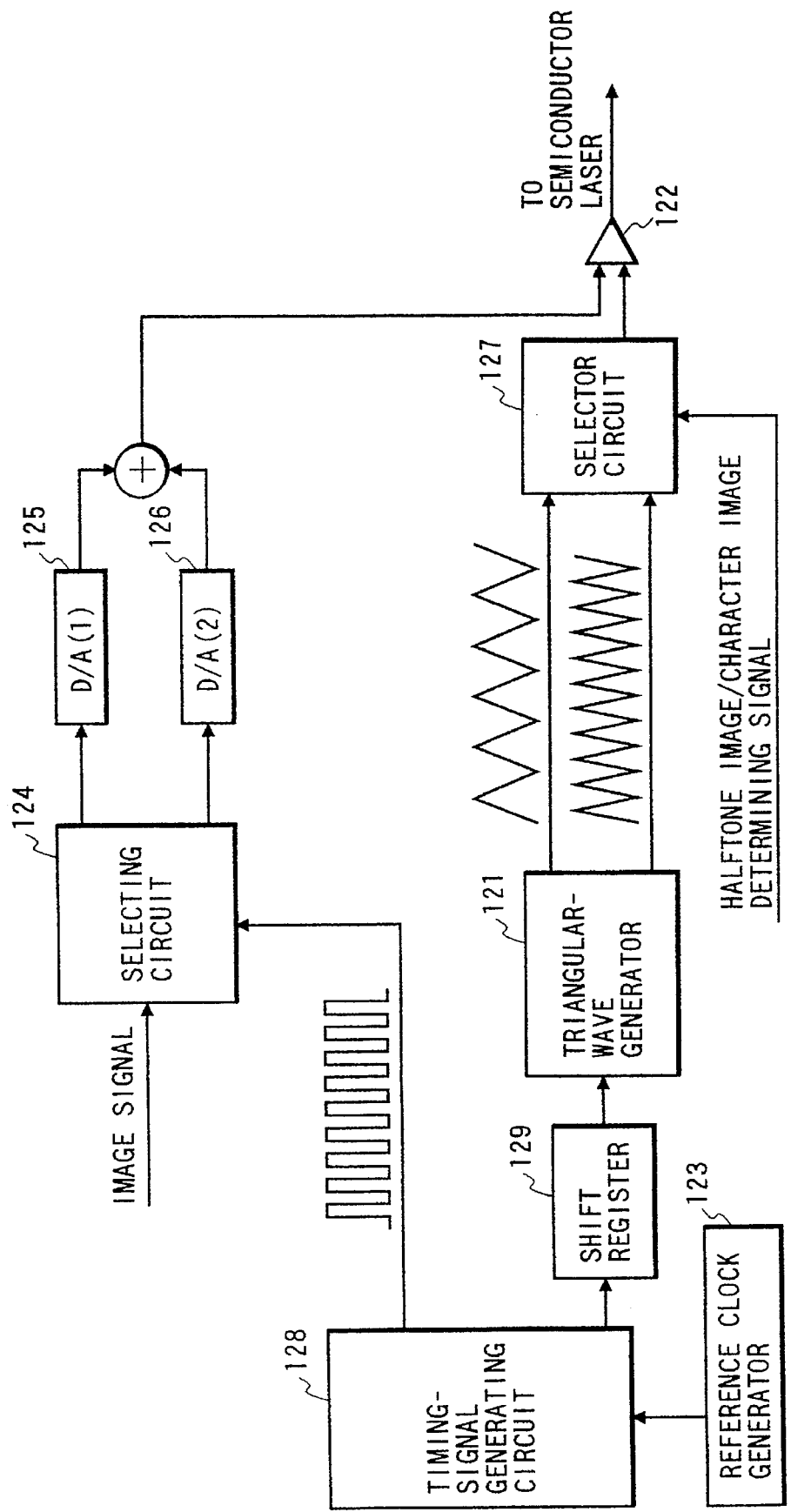
FIG. 12 is a diagram illustrating a configuration of a pulse-width modulator according to a fifth embodiment of the present invention.

FIG. 12 shows a block diagram of a fifth embodiment in which, unlike in the pulse-width modulator in the second embodiment, a shift register 129 is provided in a stage preceding the triangular-wave generator to delay the phase of the pattern signal generated by a triangular-wave generator 121 for each scanning line, so as to output a dotted image having an image-forming angle. Since the other arrangements and operation are similar to those of the second embodiment, a description thereof will be omitted.

(6th Embodiment)

In this embodiment, the same arrangements as those of the second embodiment are adopted except that, of the pattern signals of two kinds of triangular waves in the second embodiment, the pattern signal period used in the halftone image reproduction is made to correspond to 267-line screen, and that the spot diameter ($1/e^2$) of the light beam in the main scanning direction on the photoreceptor 1 (FIG. 3) is set to 63 μm.

In this configuration, when this halftone image is generated, in the case of the halftone region where the digital image-density signal is 50% or more, the halftone is generated by a 267-line screen in the same way as in the pulse-width modulation system which is generally adopted in the halftone region where the digital image-density signal is less than 50% and 20% or more, that portion of the image is periodically composed by portions subjected to D/A conversion by the first D/A converter 55 and portions subjected to D/A conversion by the second D/A converter 56. In a region where the digital image-density signal is close to 20%, portions subjected to D/A conversion by the second D/A converter substantially do not contribute to the image formation. Further, in the halftone region where the digital image-density signal is less than 20%, only the portions subjected to D/A conversion by the first D/A converter 55 contribute to the image formation. Consequently, the number of lines in the low-density portion is halved, so that the halftone image is formed by a 133-line screen having half the number of the lines of the 267-line screen. Hence, it is possible to improve the reproducibility of dots and lines in the low-density portion, and to improve the stability of gradation and color reproduction with respect to the environment.

As a comparative example for the sixth embodiment, the same arrangements as those of the second embodiment are adopted except that, of the pattern signals of two kinds of triangular waves in the second embodiment, the pattern signal period used in the halftone image reproduction is made to correspond to 200-line screen, and that the spot diameter ($1/e^2$) of the light beam in the main scanning direction on the photoreceptor 1 (FIG. 3) is set to 63 μm.

In this configuration, in the same way as in the sixth embodiment, the number of lines in the low-density portion is halved, and a halftone image is formed by the 100-line screen half the number of 200 lines. Hence, it is possible to improve the reproducibility of dots and lines in the low-density portion, and to improve the stability of gradation and color reproduction with respect to the environment. As for this 100-line screen, however, the screen structure is visually recognized, and is therefore undesirable. In contrast, in the 133-line screen in accordance with the sixth embodiment, the screen structure is not noticeable. For this reason, the number of screen lines in the low-density portion should preferably be 130 lines or more.

Figure 13A:
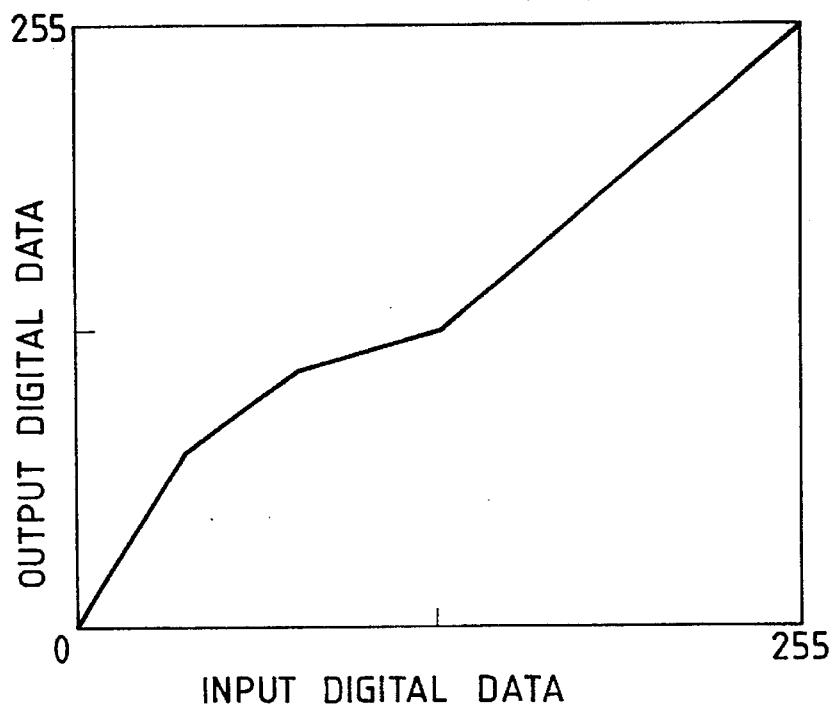
FIG. 13(a) is a conversion characteristic diagram illustrating an example of the characteristic of the image-density-signal converting unit.
Figure 13B:
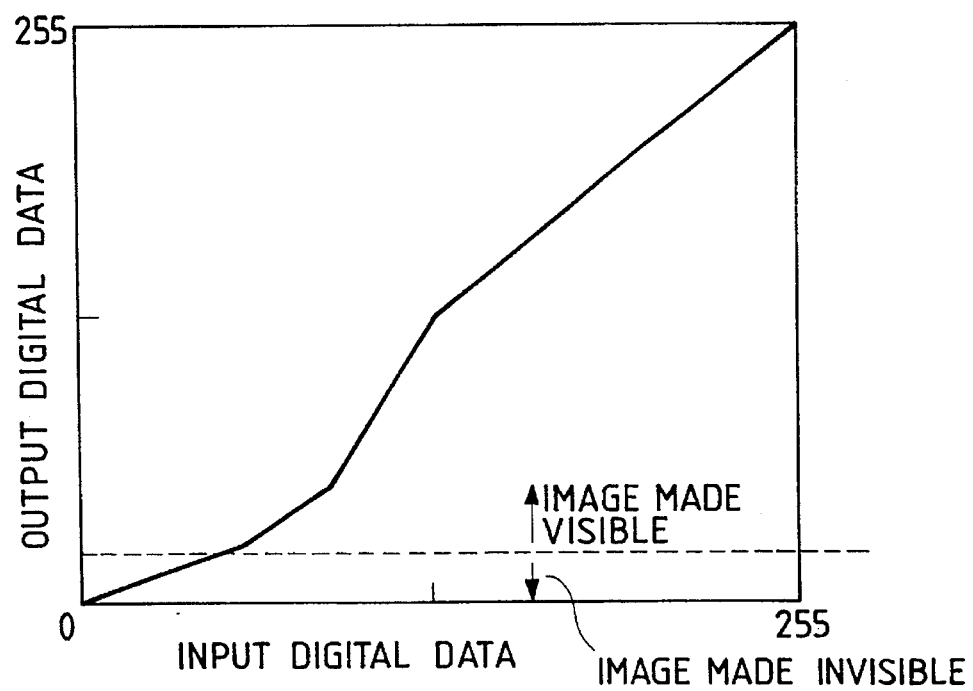
FIG. 13(b) is a conversion characteristic diagram illustrating another example of the characteristic of the image-density-signal converting unit.

In the above-described second to fifth embodiments, as for the characteristics of the image-density signal converting means, the output of one converting means with respect to the low-density portion is set to 0; however, the output of one converting means with respect to the low-density portion may be set to a value falling in a range in which the lines are not noticeable as the characteristics of the image-density signal converting means. The characteristics shown in FIGS. 13(*a*) and 13(*b*) show examples of the characteristics of such image-density signal converting means. In the apparatus shown in FIG. 3, because the semiconductor laser does not respond to a very small input signal, and because a development bias voltage is imparted to suppress the adhesion of the toner to the background, the image is made visible on emission of a laser beam having a pulse width of not less than 5% (13 in 8-bit digital data). As for the characteristic shown in FIG. 13(*b*), even in the low-density portion, the output is set to less than this value, so that the output with respect to the low-density portion is not made visible. On the other hand, as for the characteristic shown in FIG. 13(*a*), there is a region where the value is set to 13 or more, so that the output is made visible in that range.

Thus, the image becomes such that it is thinned out, and it is possible to form an image in which the number of lines is reduced in a simple dotted image of a low density in the same way as in the foregoing embodiments.

(7th Embodiment)

Figure 14:
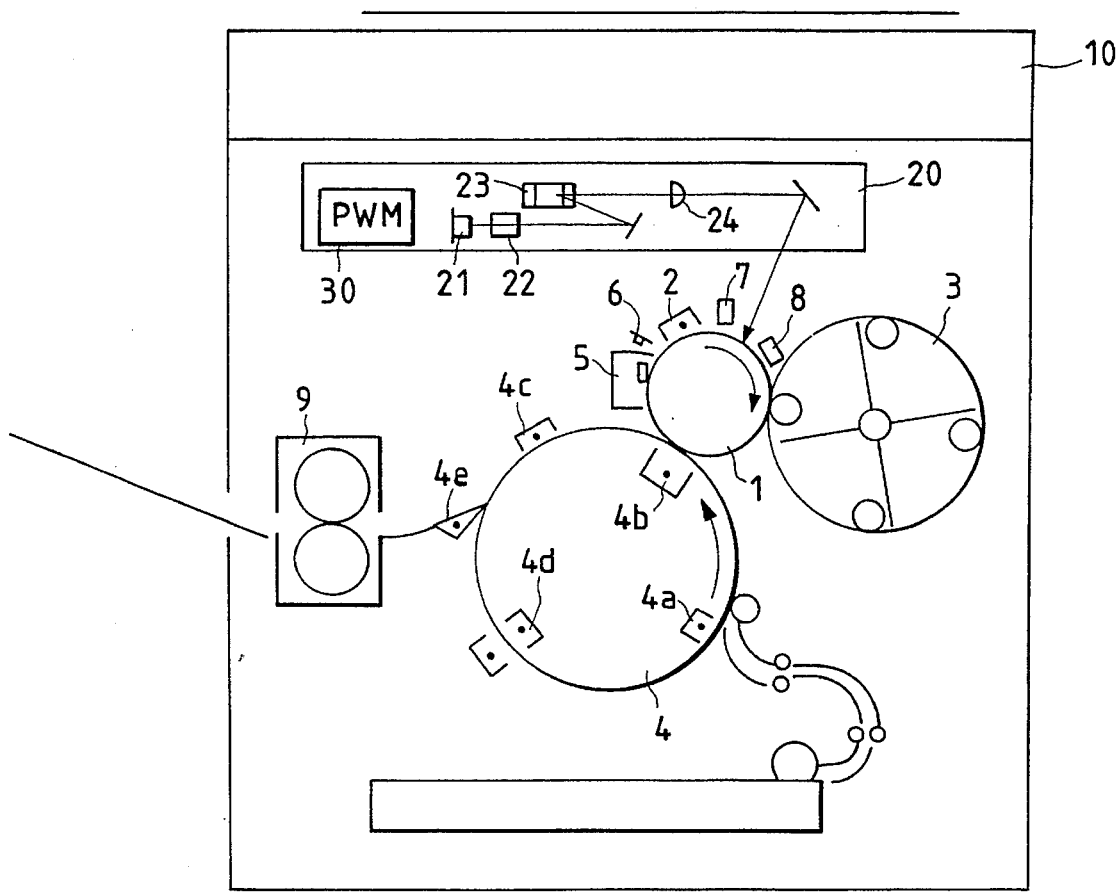
FIG. 14 is a diagram illustrating an arrangement of a seventh embodiment of an image forming apparatus according to the present invention.

FIG. 14 is a diagram illustrating a schematic arrangement of still another embodiment of the image forming apparatus in accordance with the present invention.

The charger 2, the rotating developing device 3, the transfer drum 4, the cleaner 5, a uniform exposure device 7 constituted by an LED array, and the like are disposed around the photoreceptor 1 which rotates in the direction of the arrow. It should be noted that, in FIG. 14, the same reference numerals are used for the same elements as those of the apparatus shown in FIG. 3.

Figure 15:
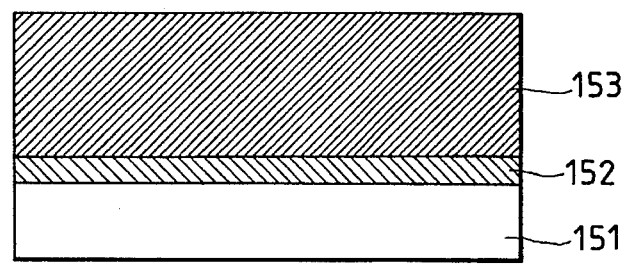
FIG. 15 is a schematic cross-sectional view of a photoreceptor used in the seventh embodiment.
Figure 16:
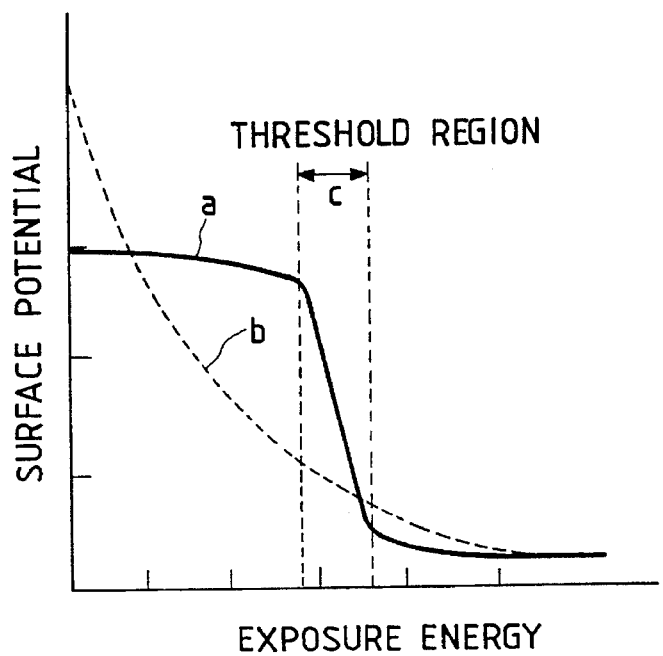
FIG. 16 is a photosensitive characteristic diagram of the photoreceptor used in the seventh embodiment.

As shown in FIG. 15, the photoreceptor 1 is comprised of an electroconductive support 151, an intermediate layer 152, and a photosensitive layer 153. Although a cylindrical drum formed of aluminum is used as the electroconductive support 151, the electroconductive support may be a metallic belt formed of a nickel belt or the like. In addition, a methoxymethylol nylon with a thickness of 0.2 μm was used as the intermediate layer 152. Further, the photosensitive layer 153 was formed by a process in which fine particles of phthalocyanine, i.e., a photoconductive pigment, having particle sizes of 0.1 to 1.0 μm were mixed and dispersed by using a solvent and a thermosetting resin consisting mainly of polyester, and the dispersion was coated on the intermediate layer 152 and was then dried. The thickness of the photosensitive layer 153 was set to 36 μm. FIG. 16 shows the photosensitive characteristic of the photosensitive material used in the photoconductive drum of this embodiment. For the purpose of comparison, the photosensitive characteristic of the photosensitive material of the function-separated type using an organic semiconductor, which is generally used conventionally, is also shown by the dotted line b. The photosensitive material of this embodiment is publicly known, and can be fabricated by a technique disclosed in Japanese Patent Unexamined Publication No. Hei. 1-169454. As shown by the solid line a in FIG. 16, this photosensitive material has such a characteristic that it responds suddenly upon reaching a certain amount of light, and the surface potential subsequently drops sharply substantially linearly. Namely, this photosensitive material exhibits the on-off operation with a certain amount of light set as a threshold.

The photoreceptor 1 is charged uniformly by the charger 2 in a dark section.

The light beam scanner 20 is comprised of the semiconductor laser 21, the collimator lens 22, the polygon mirror 23, the image-forming optical system 24, and the like, and causes the light beam to scan with respect to the photoreceptor 1. In addition, the light beam is turned on and off by the light beam pulse-width modulator 30 in response to a density signal supplied from the original reading section 10 or the like. The exposure of the photoreceptor 1 is effected by the light beam pulse thus turned of and off, and an electrostatic latent image is formed. The spot diameter ($1/e^2$) of the light beam in the main scanning direction on the photoreceptor 1 was set to 64 μm.

The rotating developing device 3 is comprised of four developing units having yellow, cyan, magenta, and black toners, respectively. Each of the developing units adopts a reversal development system using two-component magnetic brush development. As the average toner particle size, 7 μm was used. The rotating developing device 3 is rotated, as required, to develop an electrostatic latent image by the toner of a desired color. At this time, a bias voltage is applied to the developing roller to suppress the adhesion of the toner to a white background portion.

The transfer drum 4 has paper placed around its outer periphery, and rotates. The developed toner image on the photosensitive material is transferred to the paper by the transfer charger 4*b*.

The formation, development, and transfer of the electrostatic latent image is effected for each color of yellow, cyan, magenta, and black. The toner on the paper obtained through this operation is fused by the fusing device 9, thereby forming a multi-color image.

As the pulse-width modulator 30, it is possible to use one having the same configuration as that of the first embodiment shown in FIG. 1, and its arrangement and operation have been shown in the description of the first embodiment.

FIG. 17(a) shows the results of overall evaluation of the image quality and the stability of gradation and color reproduction with respect to the environment in the case of images in which the number of lines is made variable in accordance with this embodiment and in the case of images prepared with the number of lines fixed in a conventional manner. It can be appreciated that, in accordance with this embodiment, the stability of gradation and color reproduction with respect to the environment improves in a low-density portion, and smooth images can be formed in medium/high-density portions without the dots and lines being visually perceived in a conventional manner.

FIG. 17(b) shows the results of evaluation of the image quality in low-density portions formed by a 150-line screen with an image-density signal of 20% or less after carrying out 5000 prints by using a remodeled version of a digital color copying machine A-Color (trademark) made by FUJI XEROX CO., LTD. and the pulse-width modulator described in the first embodiment with respect to a photosensitive material of this embodiment having the photosensitive characteristic indicated by the solid line a in FIG. 16 and a selenium photosensitive material having the photosensitive characteristic indicated by the broken line b in FIG. 16. It can be appreciated that, in accordance with this embodiment, it is possible to obtain stable image quality with respect to changes with time of the respective characteristics when the apparatus is used.

As detailed above, in accordance with this o embodiment, when a halftone image is formed, the number of lines is made variable in response to an image-density signal by using the pulse-width modulator 30, and the number of lines at the time of forming a low-density portion is made fewer than the number of lines at the time of forming medium/high-density portions, so as to effect image formation. Further, if the distance between adjacent ones of pixele in the main scanning direction at the time of forming a low-density portion is dP (mm), and the spot diameter ($1/e^2$) of the light beam in the main scanning direction on the photosensitive material is dB (m/n), it is assumed that $$dB \leq (1/3)dP.$$

Consequently, the reproducibility of dots and lines in the low-density portion improves, and the stability of gradation and color reproduction with respect to the environment improves. In addition, further improvement of reproducibility and improvement of stability with respect to the environment are attained, coupled with the stability with respect to changes in an operating environment due to the fact that, as described above, the photosensitive characteristics of the photosensitive material used in this embodiment show digital response producing a sharp attenuation of the potential with an exposure energy point as a boundary, as indicated by the solid line in FIG. 16.

As a method of varying the number of lines, the pulse-width modulator 30 is provided with the function of effecting pulse-width modulation in accordance with an analog image-density signal and a pattern signal of a predetermined period due to the triangular-wave generator 36. In addition, pattern signals of different periods of two or more kinds are provided as the pattern signals, and the pulse-width modulator 30 is provided with the function of selecting one from among pulse-width modulation signals of two or more kinds obtained by the pattern signals of two or more kinds, in response to an image-density signal. Accordingly, the above-described advantage can be demonstrated without requiring process control and a light-emitting angle varying device which are complex and expensive.

(Modification of 7th Embodiment)

Although, in the seventh embodiment described above, the pulse-width modulator of the first embodiment shown in FIG. 1 is adopted as the pulse-width modulator 30 for turning on and off the light beam, a modification may be adopted to use one of the pulse-width modulators used in the second to fifth embodiments. Through such a modification as well, it is possible to demonstrate advantages similar to those of the seventh embodiment.

(8th Embodiment)

This embodiment has approximately the same arrangement as that of the first embodiment shown in FIG. 3, but a specific configuration of the pulse-width modulator 30 for turning on and off the light beam differs. First, a description will be given with reference to FIG. 3. The charger 2, the rotating developing device 3, the transfer drum 4, the cleaner 5 and the like are disposed around the photoreceptor 1 which rotates in the direction of the arrow. The photoreceptor 1 is charged uniformly by the charger 2 in the dark section.

The light beam scanner 20 causes the light beam to scan the photoreceptor 1. In addition, the light beam is turned on and off by the light beam pulse-width modulator 30 in response to a density signal supplied from the original reading section 10 or the like. Consequently, the exposure of the photoreceptor 1 is effected, and an electrostatic latent image is formed. The spot diameter ($1/e^2$) of the light beam in the main scanning direction on the photoreceptor 1 was set to 56 μm.

The rotating developing device 3 is comprised of four developing units having yellow, cyan, magenta, and black toners, respectively. Each of the developing units adopts a reversal development system using two-component magnetic brush development. As the average toner particle size, 7 μm was used. The rotating developing device 3 is rotated, as required, to develop an electrostatic latent image by the toner of a desired color. At this time, a bias voltage is applied to a developing roller to suppress the adhesion of the toner to a white background portion.

The transfer drum 4 has paper placed around its outer periphery, and rotates. The developed toner image on the photosensitive material is transferred to paper 4P by the transfer charger 4b.

The formation, development, and transfer of the electrostatic latent image is effected for each color of yellow, cyan, magenta, and black. The toner on the paper obtained through this operation is fused by the fusing device 9, thereby forming a multi-color image.

Figure 18:
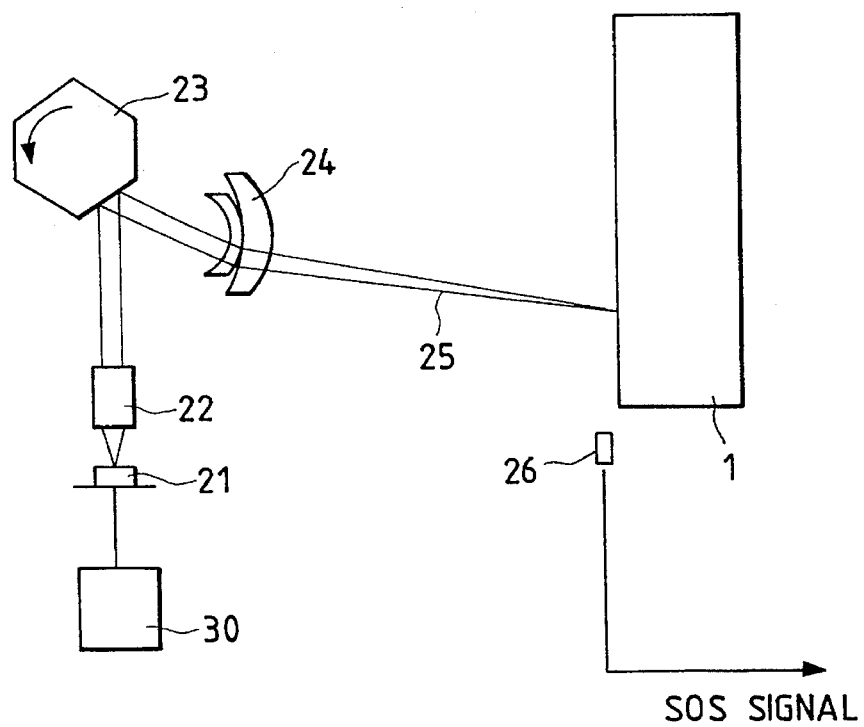
FIG. 18 is a diagram illustrating an example of the arrangement of a light beam scanner in an eighth embodiment of the present invention.

FIG. 18 is a detailed view of the light beam scanner 20 which is comprised of the semiconductor laser 21, the collimator lens 22, the polygon mirror 23, the fθ lens 24, and the like, and is further provided with a sensor 26 for generating a scanning start signal for producing an SOS signal for detecting an optical-scanning start timing.

Figure 19:
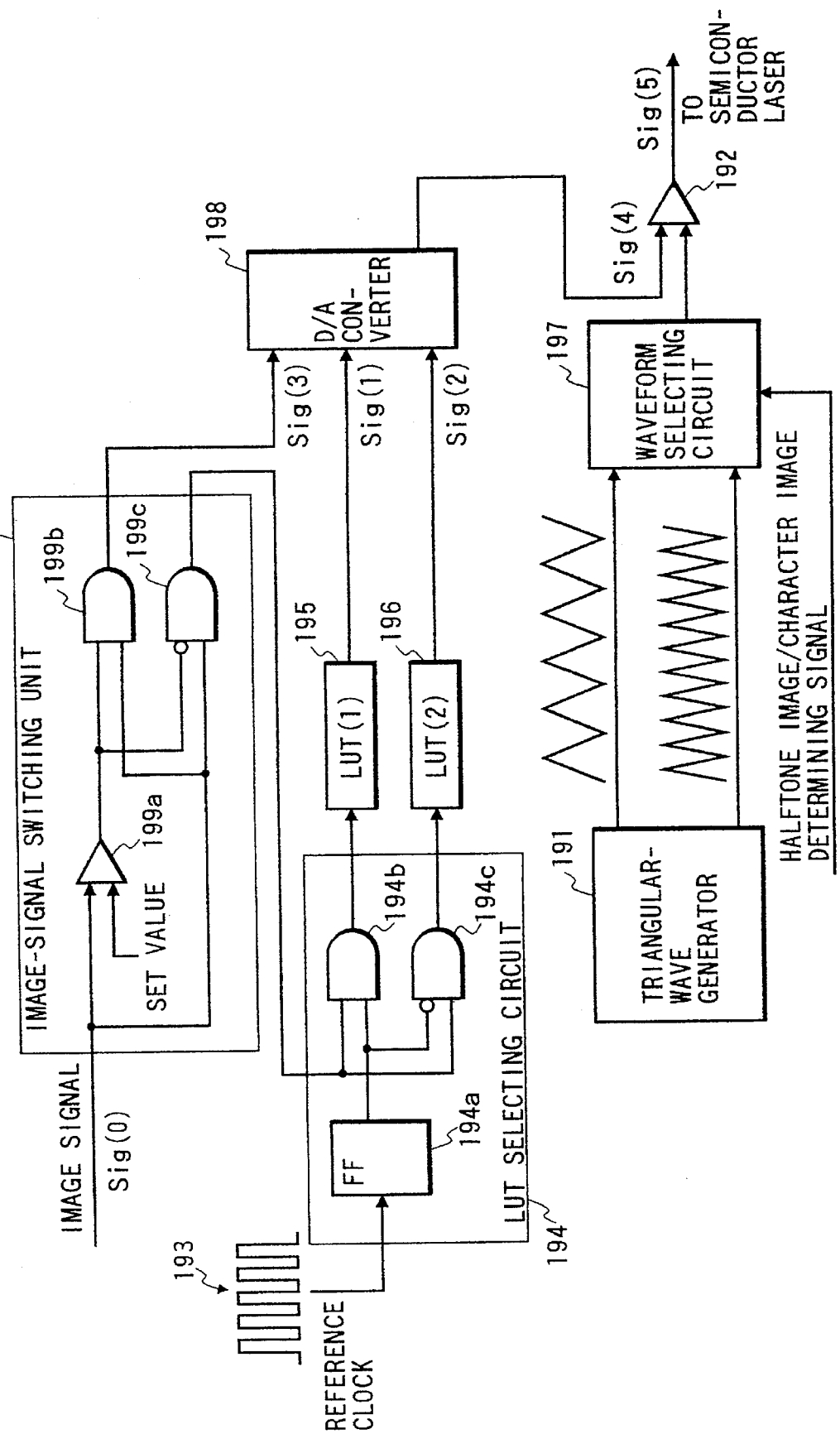
FIG. 19 is a diagram illustrating a configuration of a pulse-width modulator in the image forming apparatus according to the eighth embodiment.

As shown in FIG. 19, the pulse-width modulator 30 for turning on and off the light beam is comprised of a triangular-wave generator 191, a waveform selecting circuit 197, a comparator circuit 192, an image-signal switching unit 199, a first look-up table (LUT) 195, a second look-up table (LUT) 196, a D/A converter 198, and an LUT selecting circuit 194.

The image-signal switching unit 199 is constituted by, for instance, a comparator 199a and switching devices 199b and 199c. The comparator 199a compares a digital image-density signal supplied by the original reading section 10 or the like with a preset value. On the basis of its relative magnitude, the switching devices 199b, 199c change over the output of the image signal. If the image-density signal is greater than the preset value, the signal is directly inputted to the D/A converter 198. Meanwhile, if the image-density signal is smaller than the preset value, the signal is inputted to the LUT selecting circuit 194. The LUT selecting circuit 194 counts a reference clock signal 193, and periodically outputs digital image-density signals supplied via the image-signal switching unit 199, selectively to the first and second LUTs 195 and 196.

Figure 20A:
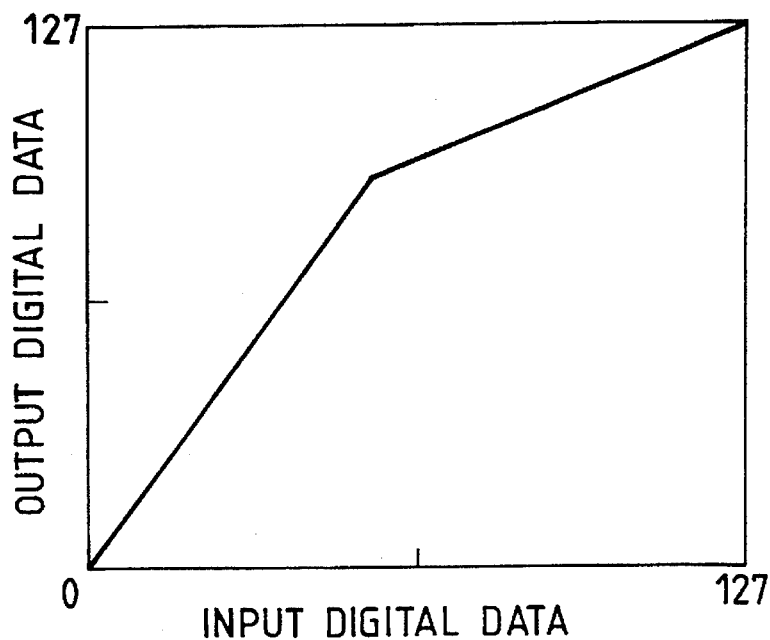
FIGS. 20(a) and 20(b) are diagrams illustrating data conversion characteristics of two LUTs used in the eighth embodiment.

The LUT selecting circuit 194 is constituted by a flip-flop circuit 194a, logic circuits 194b and 194c, and the like. The selectively outputted digital image-density signal is converted to digital data by the first and second LUTs 195, 196 having different characteristics, and is inputted to the D/A converter 198. In this embodiment, the preset value is set at 50%, and the LUTs are operated at 50% or less. For this reason, the first and second LUTs 195, 196 are capable of conversion in a range up to 50% (127 in 8-bit digital data) of 256 gradations of the image-density signal. As shown in FIG. 20(a), the first LUT has a characteristic that its output increases with a fixed gradient from 0% to 20%, and thereafter increases with a gentler slope. On the other hand, the second LUT has a characteristic that its output is 0 from 0% to 20%, and thereafter increases linearly, as shown in FIG. 20(b).

The D/A converter 198 synthesizes the signal inputted directly from the image-signal switching unit 199 and the signal inputted from the LUT selecting circuit 194 or via the first or second LUT 195, 196, and converts the same to an analog image-density signal and inputs it to the comparator circuit 192.

Figure 20B:
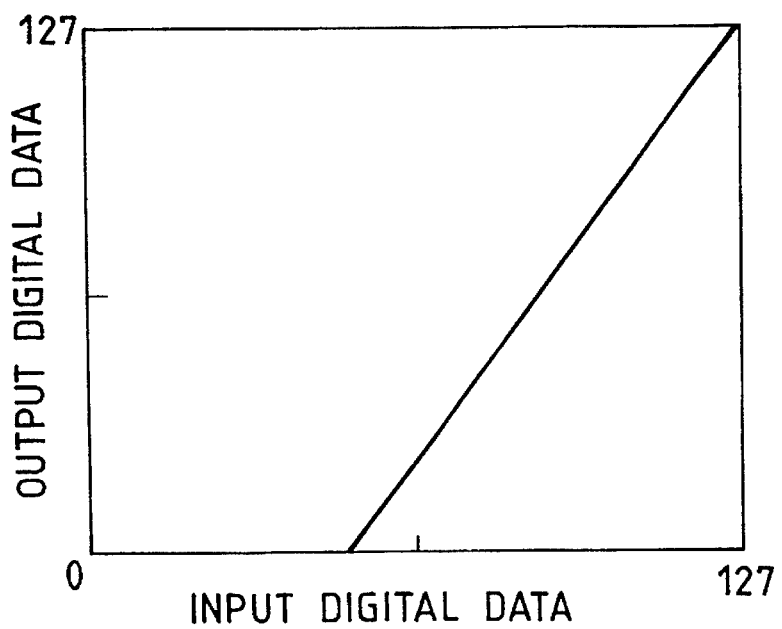

FIGS. 20(a) and 20(b) show conversion characteristics of the first and second LUTs 195, 196 for converting the input data of 128 gradations on the low-density side of the image-density signal of 256 gradations to digital data of 128 gradations.

The triangular-wave generator 191 generates pattern signals of two kinds of triangular waves. The periods of the respective pattern signals are made to correspond to 600-line screen and 300-line screen, respectively. Since the spot diameter (1/e$^2$) of the light beam in the main scanning direction on the photoreceptor 1 is set to 56 µm, the values of D become 4/3 and 2/3, respectively.

The waveform selecting circuit 197 selects a waveform by using a signal from the halftone image/character image discrimination means.

If it is determined from the halftone image/character image determining signal that the image is a character image, a pattern signal corresponding to 600-line screen is selected. Meanwhile, if it is determined that the image is a halftone image, a pattern signal corresponding to 300-line screen is selected.

The comparator circuit 192 compares the relative magnitude of each pattern signal and the analog image-density signal, and prepares a pulse-width modulation signal.

FIGS. 21(a) to 21(f) show a process of waveform generation by the pulse-width modulator in this embodiment.

First, the image signal Sig(01) is inputted to the image-signal switching unit 199, and the magnitude of the image-density signal is determined by the comparator 199a. If the image-density signal is 50% or more, the image-density signal is directly inputted to the D/A converter 198 by means of the gate circuit 199b (Sig(3)). If the image-density signal is less than 50%, the image-density signal is inputted to the LUT selecting circuit 194 by the gate circuit 199c, and the LUT selecting circuit 194 selectively outputs the image-density signal alternately to the first and second LUTs 195 and 196 on the basis of the reference clock signal, thereby generating Sig(1) and Sig(2), respectively. Sig(1), Sig(2), and Sig(3) are synthesized by the D/A converter 198 and is converted to an analog image signal. The relative magnitude of the analog image signal is compared with the triangular wave generated by the triangular-wave generator 191 by the comparator circuit 192 (Sig(4)), and a pulse-width modulation signal Sig(5) is generated. The semiconductor laser is turned on and off on the basis of the pulse-width modulation signal Sig(5), the optical scanning of one line is thereby completed, forming a latent image of one line.

When this halftone image is generated by using the pulse-width modulator arranged in accordance with this embodiment as described above, in the case of the halftone region where the digital image-density signal is 50% or more, the halftone is generated by a 300-line screen in the same way as in the pulse-width modulation system which is generally adopted.

In the halftone region where the digital image-density signal is less than 50% and 20% or more, that portion of the image is periodically composed by portions subjected to D/A conversion after being data-converted by the first LUT and portions subjected to D/A conversion after being data-converted by the second LUT. In a region where the digital image-density signal is close to 20%, portions subjected to D/A conversion after being data-converted by the second LUT substantially do not contribute to the image formation.

Further, in the halftone region where the digital image-density signal is less than 20%, only the portions subjected to D/A conversion by the D/A converter after being data-converted by the first LUT contribute to the image formation. Consequently, the halftone image is formed by the 150-line screen having half the number of the lines of the 300-line screen. Hence, it is possible to improve the reproducibility of dots and lines in the low-density portion, and to improve the stability of gradation and color reproduction with respect to the environment.

When the halftone image/character image determining signal indicates that the image is a character image, the waveform selecting circuit 197 selects a triangular wave of the period corresponding to the 600-line screen, and outputs the same to the comparator circuit 192. Since the character image is generally formed by a high-density portion, the character image is outputted directly to the D/A converter 198 by the image-signal switching unit 199. Hence, the character image is formed by the 600-line screen, and the character image is reproduced very satisfactorily.

In addition, since the image-signal switching unit is provided so that the digital image-density signal does not pass through the LUT when the digital image-density signal is 50% or more, it is not necessary for two or more LUTs to be provided in a full range with respect to the input level of the image density. Thus, the cost of memory can be halved.

Results similar to those of the first embodiment shown in FIG. 7 were obtained in the overall evaluation of the image quality and the stability of gradation and color reproduction with respect to the environment in the case of images formed by using the pulse-width modulator described in this embodiment of the present invention by using a remodeled version of a digital color copying machine A-Color made by FUJI XEROX CO., LTD. and in the case of images prepared with the number of lines fixed in a conventional manner. It can be appreciated that, in accordance with this embodiment, the stability of gradation and color reproduction with respect to the environment improves in a low-density portion, and smooth images and characters can be formed in medium/high-density portions without the dots and lines being visually perceived in a conventional manner.

(9th Embodiment)

Figure 22:
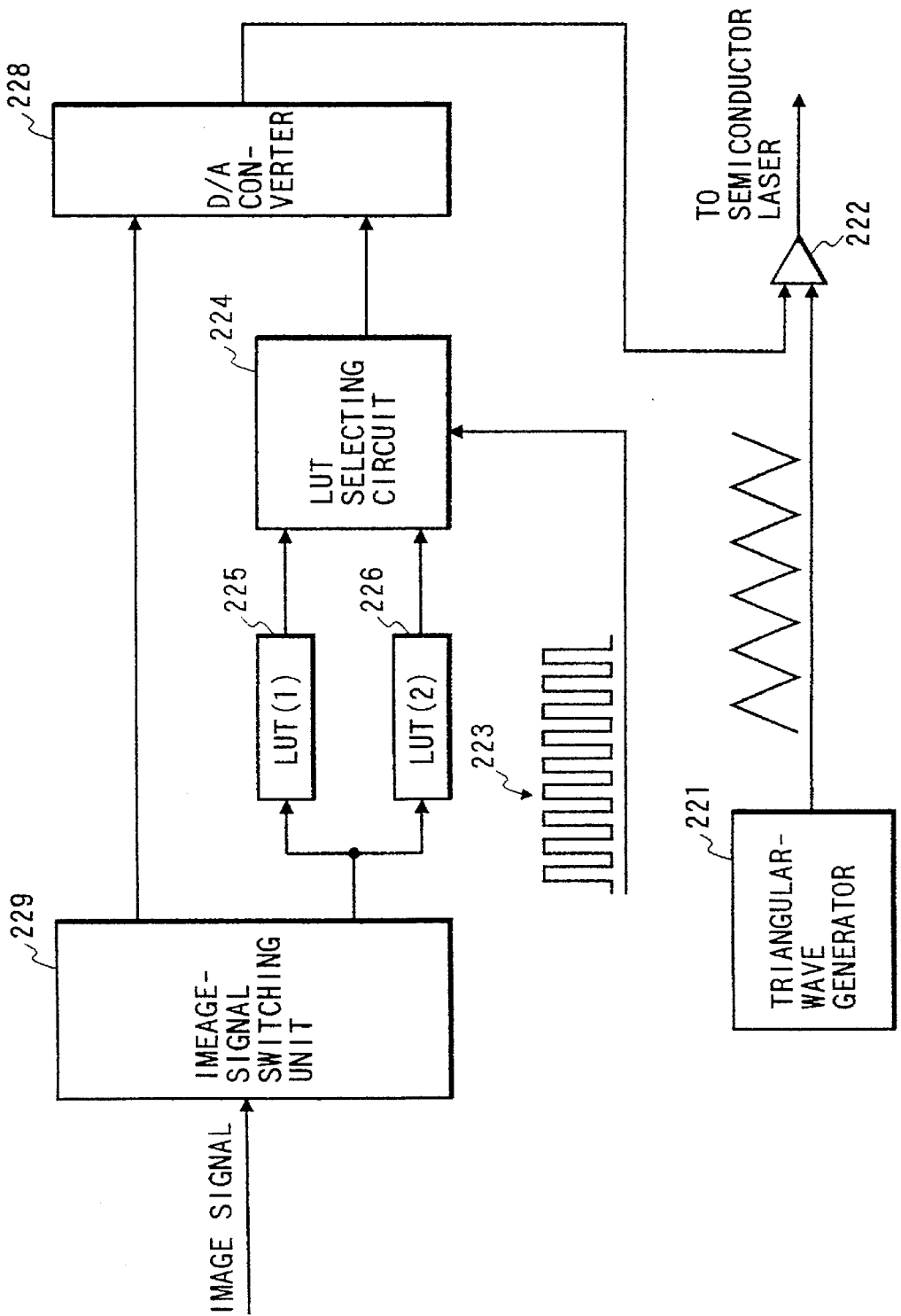
FIG. 22 is a diagram illustrating a pulse-width modulator in the image forming apparatus according to a ninth embodiment of the present invention.

This ninth embodiment is an embodiment in which the pulse-width modulator for turning on and off the light beam in the eighth embodiment is realized by a different configuration. The configuration is shown in FIG. 22. This ninth embodiment mainly differs in that, in the pulse-width modulator, the selection of the first and second LUTs in the LUT selecting circuit is effected by the output side instead of the input side. Since the other arrangements and operation are similar to those of the eighth embodiment, a description thereof will be omitted.

As shown in FIG. 22, in this pulse-width modulator, after the image signal is inputted in parallel to first and second LUTs 225 and 226, respectively, to effect signal conversion, the signals are alternately selected and synthesized by a LUT selecting circuit 224, and the synthesized signal is outputted to a D/A converter 228. Incidentally, although one pattern signal is used by a triangular-wave generator 221, the same arrangement as that of the first embodiment may be adopted.

(10th Embodiment)

Figure 23:
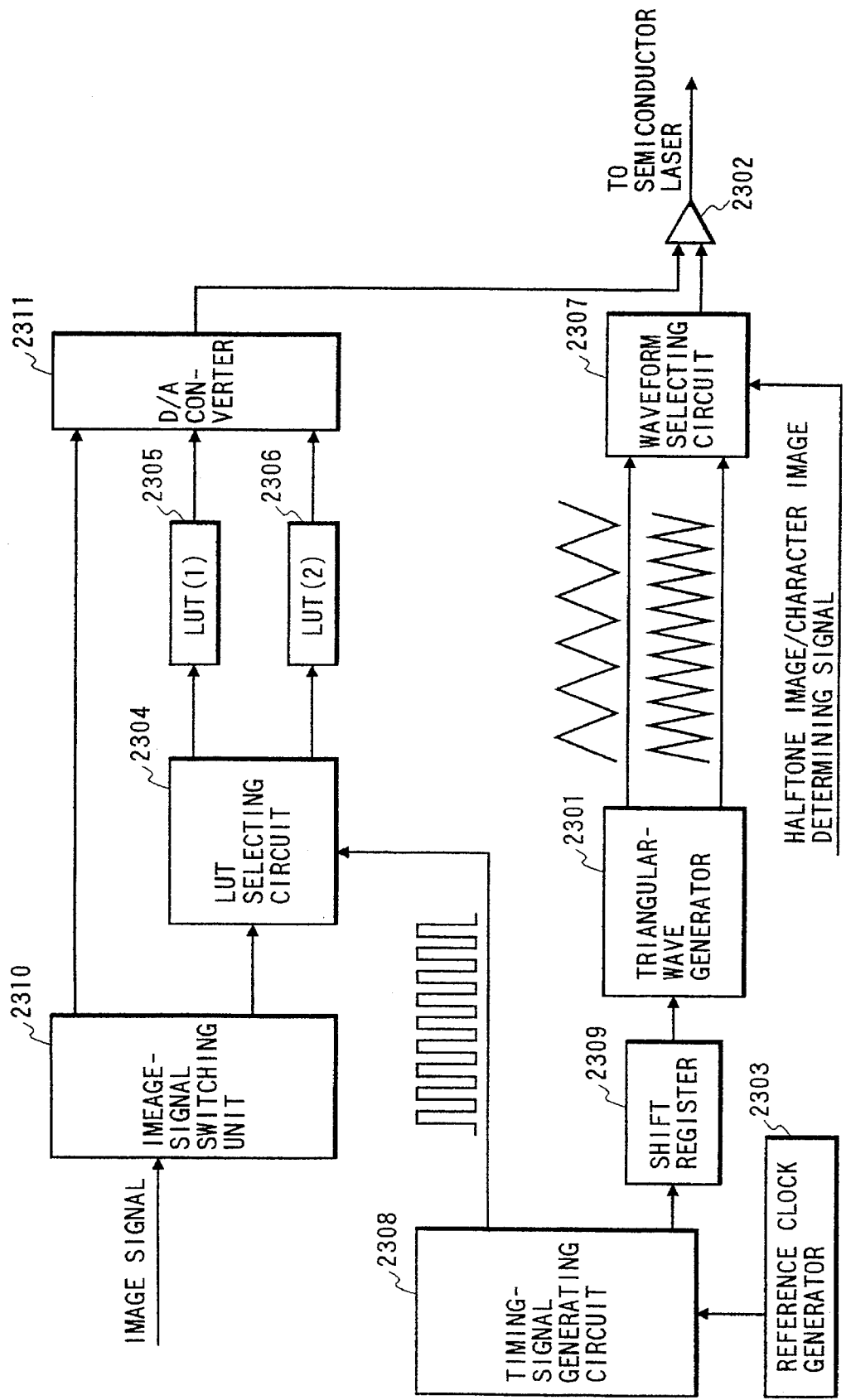
FIG. 23 is a diagram illustrating a pulse-width modulator in the image forming apparatus according to a tenth embodiment of the present invention.
Figure 24A:
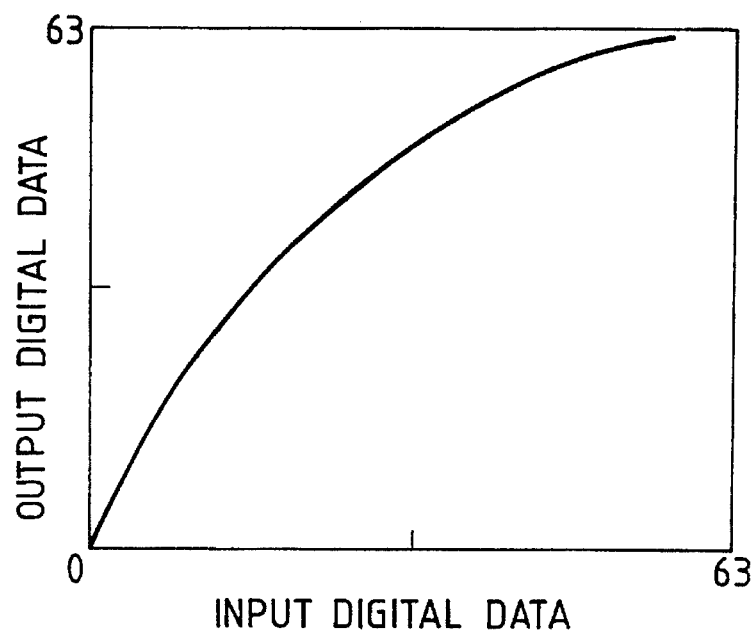
FIGS. 24(a) and 24(b) are diagrams illustrating other examples of data conversion characteristics of LUTs in accordance with the present invention.
Figure 24B:
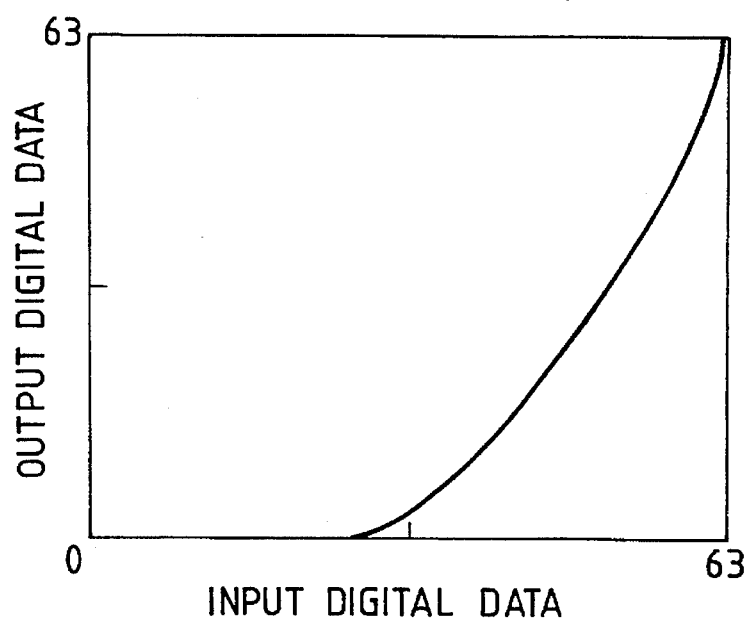

FIG. 23 shows a block diagram in accordance with a 10th embodiment in which, unlike in the pulse-width modulator in the embodiment shown in FIG. 19, a shift register 2309 is provided in a stage preceding the triangular-wave generator to delay the phase of the pattern signal generated by the triangular-wave generator for each scanning line, so as to output a dotted image having an image-forming angle. In addition, the conversion characteristics of first and second LUTs 2305 and 2306 in this embodiment are shown in FIGS. 24(a) and 24(b). Incidentally, in this embodiment, the set value is set such that the LUTs are operated at 25% (i.e., 63 in the case of 256 gradations) or less.

In each of the eighth to 10th embodiments, the arrangement provided is such that a value of a multivalued image-density signal is determined, and, in a low-density image portion in which the value of the image-density signal is not more than a certain value, image-density-signal converting units having a plurality of different gradation-reproducing characteristics are used, so that these converting units are operated sequentially in the main scanning direction in a time-sharing manner. Accordingly, the stability of gradation and color reproduction with respect to the environment is improved in the low-density portion without entailing increased cost of memory and without requiring process control and a light-emission-intensity varying device, which are complex and expensive, a precision and expensive beam image-forming optical system, or the like. In addition, it is possible to improve the reproducibility of character images and the like which are mixed in a halftone image.

According to the present invention, the number of lines is made variable in response to an image-density signal, and combinations of screens having a plurality of different gradation-reproducing characteristics are realized when a halftone image within the same image plane is formed. Accordingly, the reproducibility of dots and lines in the low-density portion is improved without requiring process control and a light-emission-intensity varying device, which are complex and expensive, a precision and expensive beam image-forming optical system, or the like. In addition, it is possible to improve the stability of gradation and color reproduction with respect to the environment, and improve the reproducibility of character images and the like which are mixed in a halftone image.

In an arrangement which uses as a photosensitive medium of the present invention a digital light-inputting photosensitive medium in which the photosensitive medium does not respond immediately on incidence of a light input thereupon, but responds suddenly after accumulation of a certain amount of light and undergoes a quick attenuation of the potential, it is possible to further improve the reproducibility of dots and lines in the low-density portion as well as the stability of gradation and color reproduction with respect to the environment.

In addition, according to the present invention, the arrangement provided is such that a value of a multivalued image-density signal is determined, and, in a low-density image portion in which the value of the image-density signal is not more than a predetermined value, image-density-signal converting units having a plurality of different gradation-reproducing characteristics are used, so that these converting units are operated sequentially in the main scanning direction in a time-sharing manner. Accordingly, if the value of the image-density signal is greater than the predetermined value in the determination, the digital image-density signal is not made to pass through the LUT, it is not necessary for these converting means to be provided in a full range with respect to the input level of the image density. Thus, it is possible to substantially reduce the cost of the apparatus, particularly the cost of memory.

What is claimed is:

1. An image forming apparatus comprising:

pulse-width modulating means for subjecting an image-density signal to pulse-width modulation; and image-forming means for forming an image in accordance with a pulse-width modulation signal outputted by said pulse-width modulating means;

wherein said pulse-width modulating means comprises means for simultaneously generating a plurality of modulation signals having different modulation periods, and selecting means for selecting a modulation period of a pulse-width modulated wave to be outputted, in accordance with the image-density signal.

2. An image forming apparatus comprising:

pulse-width modulating means for subjecting an image-density signal to pulse-width modulation;

image-forming means for forming an image in accordance with a pulse-width modulation signal outputted by said pulse-width modulating means; and at least two image-density-signal converting means having different characteristics for converting a multivalued image-density signal, wherein at least one of said image-density-signal converting means has a characteristic of converting an image-density signal corresponding to a low-density portion of the inputted image-density signal to an image-density signal of 0 or in an invisible range, and said at least two image-density-signal converting means operate in a time-sharing manner with respect to multivalued image-density signals arrayed in a main scanning direction.

3. The image forming apparatus according to claim 2, wherein said image-forming means has at least a photosensitive medium, means for forming an electrostatic latent image on the photosensitive medium, and means for developing the electrostatic latent image, and wherein the photosensitive medium is a digital light-inputting photosensitive medium in which the photosensitive medium does not respond immediately on incidence of a light input thereupon, but responds suddenly after accumulation of a certain amount of light and undergoes a quick attenuation of potential.

4. The image forming apparatus according to claim 2, wherein image-density-signal switching means for determining whether or not a value of the image-density signal is greater than a predetermined value is provided in a stage preceding said image-density-signal converting means, on the basis of a result of determination by said image-density-signal switching means the image-density signal is inputted to said pulse-width modulating means through said image-density-signal converting means if the value of the image-density signal is smaller than the predetermined value, while the image-density signal is outputted to said pulse-width modulating means without being passed through said image-density-signal converting means if the value of the image-density signal is greater than the predetermined value, and wherein said image-density-signal converting means has as an object of conversion an image-density signal falling in a range in which the image-density signal is smaller than the predetermined value.

5. An image forming apparatus comprising:
   pulse-width modulating means for subjecting an image-density signal to pulse-width modulation;
   image-forming means for forming an image in accordance with a pulse-width modulation signal outputted by said pulse-width modulating means; and
   at least two image-density-signal converting means having different characteristics for converting a multivalued image-density signal,
   wherein said image-forming means has light-beam scanning means for relatively scanning a light beam with respect to the photosensitive medium, and an image-forming optical system for forming a light beam spot of a predetermined size on the photosensitive medium by focusing the light beam, and wherein if it is assumed that a distance between adjacent ones of pixels in the main scanning direction at the time of forming an image in a low-density portion is dp (mm), and that the spot diameter ($1/e^2$) of the light beam in the main scanning direction on the photosensitive medium is dB (mm), the following formula is satisfied:

$$dB \leq (1/3)dp.$$

6. The image forming apparatus according to claim 2, wherein the number of screen lines in a low-density portion formed by said image-forming means is 130 or more.

* * * * *